US012666305B2

(12) United States Patent
Patil et al.

(10) Patent No.: US 12,666,305 B2
(45) Date of Patent: \*Jun. 23, 2026

(54) SEQUENCE NUMBER EXPANSION

(71) Applicant: QUALCOMM Incorporated, San Diego, CA (US)

(72) Inventors: Abhishek Pramod Patil, San Diego, CA (US); Alfred Asterjadhi, San Diego, CA (US); George Cherian, San Diego, CA (US); Sai Yiu Duncan Ho, San Diego, CA (US); Lochan Verma, Danville, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,122

(22) Filed: Jan. 29, 2024

(65) Prior Publication Data

US 2024/0172044 A1 May 23, 2024

Related U.S. Application Data

(63) Continuation of application No. 17/028,024, filed on Sep. 22, 2020, now Pat. No. 11,985,543.

(Continued)

(51) Int. Cl.
*H04W 28/06* (2009.01)
*H04W 72/20* (2023.01)

(52) U.S. Cl.
CPC ......... *H04W 28/065* (2013.01); *H04W 72/20* (2023.01)

(58) Field of Classification Search
USPC ........ 370/252, 389, 394, 471, 473, 474, 476
See application file for complete search history.

(56) References Cited

U.S. PATENT DOCUMENTS 9,253,290 B2   2/2016   Asterjadhi et al.
11,221,972 B1   1/2022   Raman et al.
(Continued)

FOREIGN PATENT DOCUMENTS

TW       201531051 A    8/2015
WO     2014014577      1/2014

OTHER PUBLICATIONS

ERICSSON., et al., "Limitation of PDCP SN and FMS-Fields", 3GPP TSG-RAN WG2 #79, 3GPP Draft; Tdoc R2-123875 Limitation of PDCP SN and FMS-Fields, 3rd Generation Partnership Project (3GPP), Mobile Competence Centre; 650, Route Des Lucioles; F-06921 Sophia-Antipolis Cedex; France, vol. RAN WG2, QingDao, China, Aug. 13, 2012-Aug. 17, 2012, pp. 1-9, Aug. 7, 2012 (Aug. 7, 2012), XP050665722, p. 1, section 2, par. 2, p. 4, section 3.1, p. 4, section 3.2, par. 1, last sentence, p. 5, section 3.3.1.

(Continued)

*Primary Examiner* — Nguyen H Ngo
(74) *Attorney, Agent, or Firm* — Holland & Hart LLP

(57) ABSTRACT

This disclosure provides systems, methods and apparatus, including computer programs encoded on computer storage media, for identifying frames or packets of data that were received in error (such as incorrectly decoded or not received at all) by a receiving device for purposes of retransmission. In one aspect, a wireless device may form a number of frames for wireless transmission. Each of the frames may include a frame header and may be associated with a unique sequence number. In some implementations, for each of the frames, the wireless device may embed at least a portion of the unique sequence number into a portion of a control field or a delimiter field of the frame header. In some other implementations, for each of the frames, the wireless device may signal at least a portion of the unique (Continued)

1000 —

Form a plurality of frames for wireless transmission, where each of the plurality of frames includes a respective frame header. (1001)

↓

Associate each of the plurality of frames with one of a plurality of unique sequence numbers. (1002)

↓

Embed, for each of the plurality of frames, at least a portion of the unique sequence number in a control field of the respective frame header. (1003)

↓

Transmit the plurality of frames to a receiving device. (1004)

sequence number using bit locations unassociated with a sequence number field of the frame header.

19 Claims, 15 Drawing Sheets

Related U.S. Application Data

(60) Provisional application No. 62/945,585, filed on Dec. 9, 2019, provisional application No. 62/914,811, filed on Oct. 14, 2019.

(56) References Cited

U.S. PATENT DOCUMENTS

| | | | | |
|---|---|---|---|---|
| 11,985,543 | B2 * | 5/2024 | Patil | H04W 28/065 |
| 2003/0031210 | A1 * | 2/2003 | Harris | H04L 49/9052 |
| | | | | 370/522 |
| 2006/0168504 | A1 | 7/2006 | Meyer et al. | |
| 2008/0225743 | A1 | 9/2008 | Damnjanovic | |
| 2012/0002648 | A1 | 1/2012 | Peisa | |
| 2012/0281651 | A1 * | 11/2012 | Jonsson | H04L 69/22 |
| | | | | 370/329 |
| 2012/0314719 | A1 * | 12/2012 | Agiwal | H04W 28/02 |
| | | | | 370/474 |
| 2013/0128809 | A1 * | 5/2013 | Wentink | H04L 45/74 |
| | | | | 370/328 |
| 2013/0195001 | A1 * | 8/2013 | Liu | H04L 69/22 |
| | | | | 370/312 |
| 2013/0315202 | A1 | 11/2013 | May | |
| 2015/0146617 | A1 | 5/2015 | Park et al. | |
| 2016/0142521 | A1 | 5/2016 | Rison | |
| 2017/0126384 | A1 | 5/2017 | Noh et al. | |
| 2017/0366312 | A1 | 12/2017 | Chu et al. | |
| 2017/0374595 | A1 * | 12/2017 | Ou | H04W 28/0226 |
| 2018/0183548 | A1 * | 6/2018 | Gan | H04L 1/1614 |
| 2018/0310198 | A1 | 10/2018 | Zhou et al. | |
| 2019/0150214 | A1 * | 5/2019 | Zhou | H04W 76/15 |
| | | | | 370/329 |
| 2020/0077417 | A1 | 3/2020 | Seok et al. | |
| 2020/0153567 | A1 * | 5/2020 | Agarwal | H04L 1/1692 |
| 2020/0214036 | A1 | 7/2020 | Min et al. | |
| 2020/0413285 | A1 | 12/2020 | Li et al. | |
| 2021/0014679 | A1 * | 1/2021 | Liu | H04W 12/50 |
| 2021/0083805 | A1 | 3/2021 | Kneckt et al. | |
| 2021/0112451 | A1 | 4/2021 | Patil et al. | |

OTHER PUBLICATIONS

International Preliminary Report on Patentability—PCT/US2020/052124 The International Bureau of WIPO—Geneva, Switzerland, Apr. 24, 2022.

International Search Report and Written Opinion—PCT/US2020/052124—ISA/EPO—Mar. 12, 2021.

Partial International Search Report—PCT/US2020/052124—ISA/EPO—Jan. 11, 2021.

Taiwan Search Report—TW109132885—TIPO—Feb. 21, 2024.

\* cited by examiner

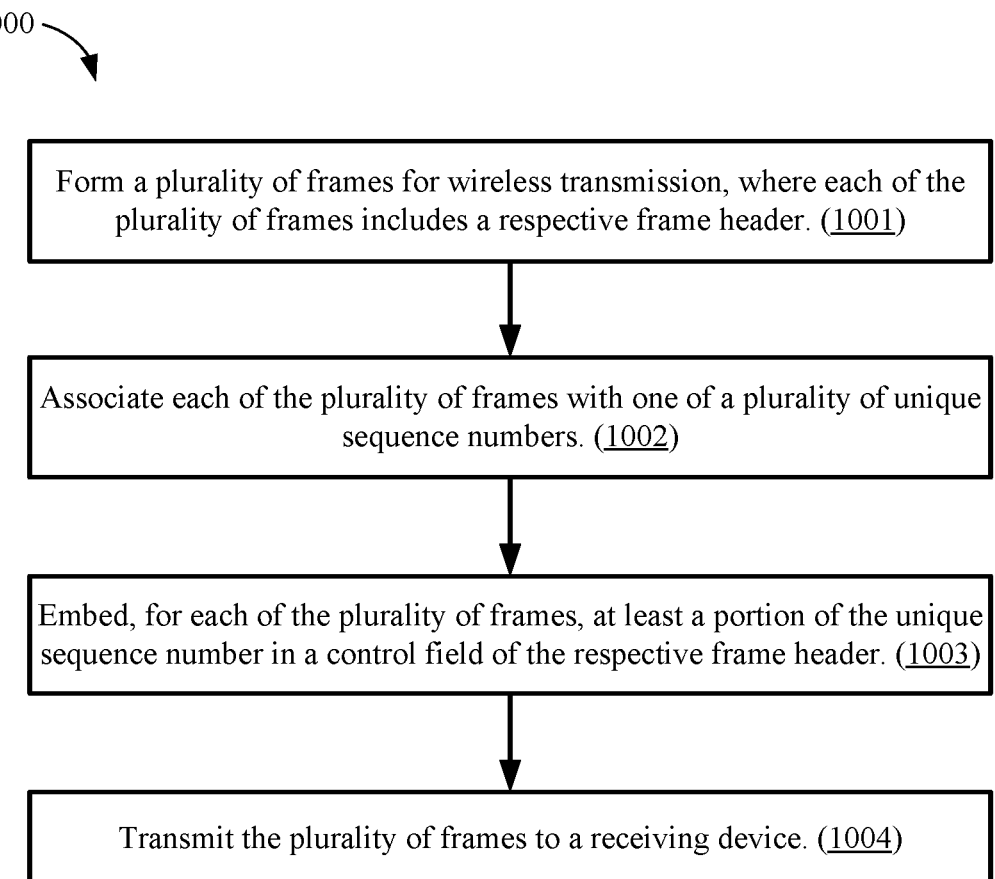

1000

Form a plurality of frames for wireless transmission, where each of the plurality of frames includes a respective frame header. (1001)

Associate each of the plurality of frames with one of a plurality of unique sequence numbers. (1002)

Embed, for each of the plurality of frames, at least a portion of the unique sequence number in a control field of the respective frame header. (1003)

Transmit the plurality of frames to a receiving device. (1004)

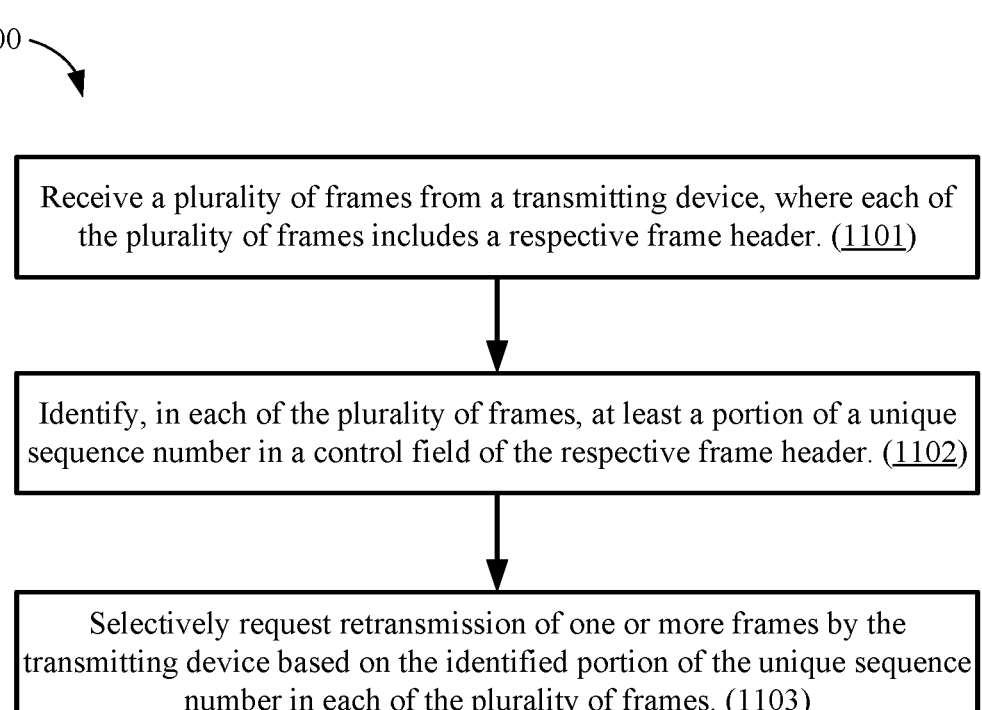

Receive a plurality of frames from a transmitting device, where each of the plurality of frames includes a respective frame header. (1101)

Identify, in each of the plurality of frames, at least a portion of a unique sequence number in a control field of the respective frame header. (1102)

Selectively request retransmission of one or more frames by the transmitting device based on the identified portion of the unique sequence number in each of the plurality of frames. (1103)

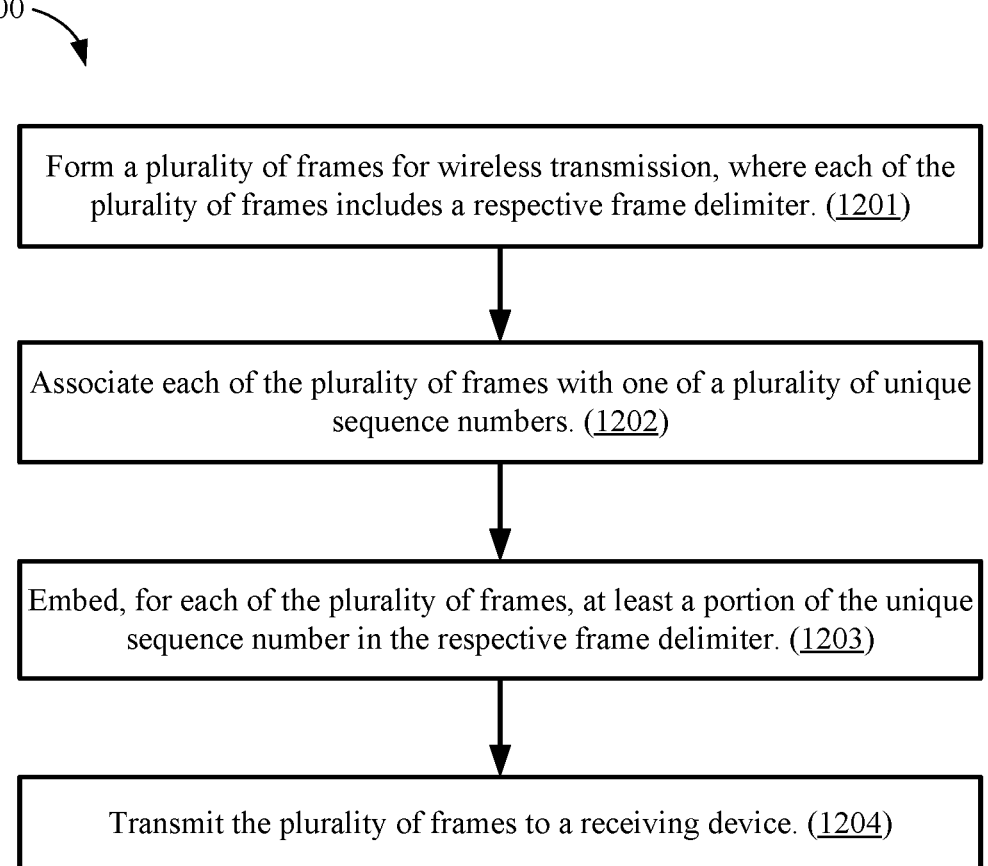

Form a plurality of frames for wireless transmission, where each of the plurality of frames includes a respective frame delimiter. (1201)

Associate each of the plurality of frames with one of a plurality of unique sequence numbers. (1202)

Embed, for each of the plurality of frames, at least a portion of the unique sequence number in the respective frame delimiter. (1203)

Transmit the plurality of frames to a receiving device. (1204)

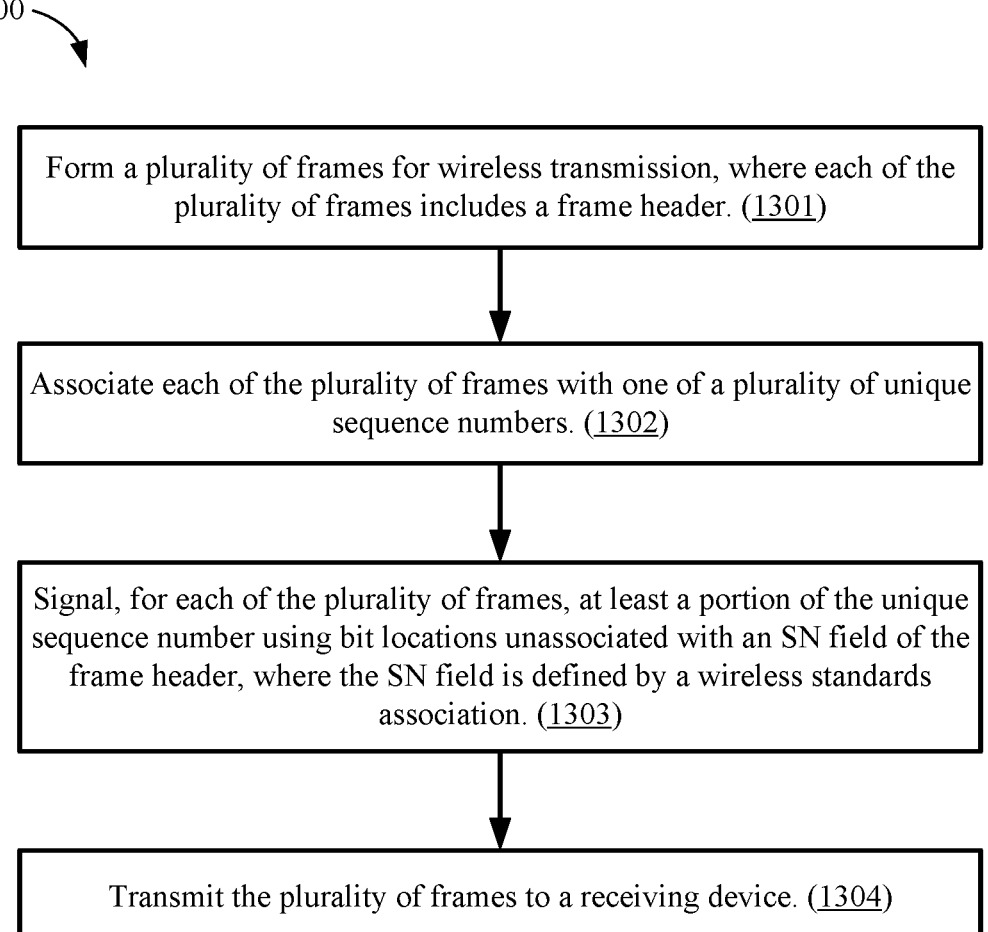

Form a plurality of frames for wireless transmission, where each of the plurality of frames includes a frame header. (1301)

Associate each of the plurality of frames with one of a plurality of unique sequence numbers. (1302)

Signal, for each of the plurality of frames, at least a portion of the unique sequence number using bit locations unassociated with an SN field of the frame header, where the SN field is defined by a wireless standards association. (1303)

Transmit the plurality of frames to a receiving device. (1304)

Figure 13

SEQUENCE NUMBER EXPANSION

CROSS-REFERENCE TO RELATED APPLICATIONS

This patent application is a continuation of U.S. patent application Ser. No. 17/028,024 by PATIL et al., entitled "SEQUENCE NUMBER EXPANSION," filed Sep. 22, 2020, which claims priority to U.S. Provisional Patent Application No. 62/945,585 entitled "SEQUENCE NUMBER EXPANSION" and filed on Dec. 9, 2019 and to U.S. Provisional Patent Application No. 62/914,811 entitled "SEQUENCE NUMBER EXPANSION" and filed on Oct. 14, 2019, each of which are assigned to the assignee hereof. The disclosures of all prior applications are considered part of and are incorporated by reference in this patent application.

TECHNICAL FIELD

This disclosure relates generally to wireless communications, and more specifically to expanding the sequence number for wireless communication frames.

DESCRIPTION OF THE RELATED TECHNOLOGY

A wireless local area network (WLAN) may be formed by one or more access points (APs) that provide a shared wireless medium for use by a number of client devices or stations (STAs). Each AP, which may correspond to a Basic Service Set (BSS), may periodically broadcast beacon frames to enable any STAs within wireless range of the AP to establish and maintain a communication link with the WLAN. WLANs that operate in accordance with the IEEE 802.11 family of standards are commonly referred to as Wi-Fi networks.

Imperfect channel conditions on the wireless communication medium may cause data loss during wireless data transmissions from a transmitting device to a receiving device. If the receiving device does not receive (or cannot decode) one or more portions of the transmitted data, the transmitting device may retransmit the one or more portions of data until received and properly decoded by the receiving device. The receiving device may identify a particular packet or frame of data to be retransmitted based, at least in part, on a sequence number appended to the packet by the transmitting device. Existing IEEE 802.11 standards provide a 12-bit sequence number that can be included in the media access control (MAC) header of each data packet. This 12-bit sequence number encompasses a sequence number space of 4096. However, as wireless signaling capabilities continue to evolve, it may be desirable to expand the sequence number space to support wireless communications at significantly higher throughputs.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communications. The method can be performed by a wireless device, for purposes of retransmission, to identify frames or packets of data that were received in error (such as incorrectly decoded or not received at all) by the wireless device. In some implementations, the method can include forming a plurality of frames for wireless transmission, where each of the plurality of frames includes a respective frame header; associating each of the plurality of frames with one of a plurality of unique sequence numbers; embedding, for each of the plurality of frames, at least a portion of the unique sequence number in a control field of the respective frame header.

In some implementations, a length of the unique sequence number is greater than 12 bits. In some implementations, the method can further include embedding the remainder of the unique sequence number in a sequence number (SN) field of the respective frame header, where the SN field is defined by a wireless standards association. In some aspects, the SN field may carry 12 bits of the unique sequence number, and the control field may carry at least one bit of the unique sequence number. In some other implementations, the method can further include embedding a bit sequence in an SN field of the respective frame header, where the bit sequence indicates that the unique sequence number is carried in the control field of the frame header.

In some implementations, the frame header may be a medium access control (MAC) header and the control field may include a pair of bits followed by an aggregated control (A-Control) subfield. In some aspects, the at least portion of the unique sequence number may be embedded in a new control information subfield of the A-Control subfield. In some implementations, the control field can be one of a high-efficiency (HE) frame control field associated with the Institute of Electrical and Electronics Engineers (IEEE) 802.11ax amendment of the IEEE 802.11 standard or an extremely high-throughput (EHT) frame control field associated with the IEEE 802.11be amendment of the IEEE 802.11 standard. In some aspects, the at least portion of the unique sequence number may replace one or more bits of the A-Control subfield of the HE frame control field or the EHT frame control field.

Another innovative aspect of the subject matter described in this disclosure can be implemented in a wireless communication device. The wireless communication device can include at least one modem, at least one processor communicatively coupled with the at least one modem, and at least one memory communicatively coupled with the at least one processor. The memory stores instructions that, when executed by the at least one processor, can cause the wireless communication device to form a plurality of frames for wireless transmission, where each of the plurality of frames includes a respective frame header; associate each of the plurality of frames with one of a plurality of unique sequence numbers; embed, for each of the plurality of frames, at least a portion of the unique sequence number in a control field of the respective frame header; and transmit the plurality of frames to a receiving device.

Another innovative aspect of the subject matter described in this disclosure can be implemented as a method for wireless communications. The method can be performed by a wireless device, for purposes of retransmission, to identify frames or packets of data that were received in error (such as incorrectly decoded or not received at all) by the wireless device. In some implementations, the method can include receiving a plurality of frames from a transmitting device, where each of the plurality of frames includes a respective frame header; identifying, in each of the plurality of frames, at least a portion of a unique sequence number in a control field of the respective frame header; and selectively requesting retransmission of one or more frames by the transmitting device based on the identified portion of the unique sequence number in each of the plurality of frames.

In some implementations, a length of the unique sequence number may be greater than 12 bits. In some implementations, the method may further include identifying the remainder of the unique sequence number in a sequence number (SN) field of the frame header of the respective frame, where the SN field is defined by a wireless standards association. In some aspects, the SN field may carry 12 bits of the unique sequence number and the control field may carry at least one bit of the unique sequence number. In some implementations, the method may further include determining, based on a bit sequence in an SN field of the respective frame header, that the unique sequence number is carried in the control field of the respective frame header.

In some implementations, the frame header may be a MAC header and the control field may include a pair of bits followed by an A-Control subfield. In some aspects, the at least portion of the unique sequence number may be identified in a new control information subfield of the A-Control subfield. In some implementations, the control field may be one of an HE frame control field associated with the IEEE 802.11ax amendment of the IEEE 802.11 standard or an EHT frame control field associated with the IEEE 802.11be amendment of the IEEE 802.11 standard. In some aspects, the at least portion of the unique sequence number replaces one or more bits of the A-Control subfield of the HE frame control field or the EHT frame control field.

Another innovative aspect of the subject matter described in this disclosure can be implemented in a wireless communication device. The wireless communication device can include at least one modem, at least one processor communicatively coupled with the at least one modem, and at least one memory communicatively coupled with the at least one processor. The memory stores instructions that, when executed by the at least one processor, can cause the wireless communication device to receive a plurality of frames from a transmitting device, where each of the plurality of frames including a respective frame header; identify, in each of the plurality of frames, at least a portion of a unique sequence number in a control field of the respective frame header; and selectively request retransmission of one or more frames by the transmitting device based on the identified portion of the unique sequence number in each of the plurality of frames.

Another innovative aspect of the subject matter described in this disclosure can be implemented as a method for wireless communications. The method can be performed by a wireless device, for purposes of retransmission, to identify frames or packets of data that were received in error (such as incorrectly decoded or not received at all) by the wireless device. In some implementations, the method can include forming a plurality of frames for wireless transmission, where each of the plurality of frames includes a respective frame delimiter; associating each of the plurality of frames with one of a plurality of unique sequence numbers; embedding, for each of the plurality of frames, at least a portion of the unique sequence number in the respective frame delimiter; and transmitting the plurality of frames to a receiving device.

In some implementations, the at least portion of the unique sequence number may be embedded in an SN extension field of the frame delimiter. In some other implementations, the at least portion of the unique sequence number may be represented by one or more repurposed bits of a delimiter signature field of the frame delimiter. In some aspects, the frame header may include a MAC header and each of the plurality of frames may include a MAC protocol data unit (MPDU). In some implementations, the method may further include aggregating one or more of the MPDUs into aggregated frames and transmitting one or more of the aggregated frames. In some aspects, at least one of the aggregated frames can include an aggregated MPDU (A-MPDU). In some other aspects, at least one of the aggregated frames can include a single MPDU (S-MPDU).

Another innovative aspect of the subject matter described in this disclosure can be implemented as a method for wireless communications. The method can be performed by a wireless device, for purposes of retransmission, to identify frames or packets of data that were received in error (such as incorrectly decoded or not received at all) by the wireless device. In some implementations, the method can include forming a plurality of frames for wireless transmission, where each of the plurality of frames includes a frame header; associating each of the plurality of frames with one of a plurality of unique sequence numbers; signaling, for each of the plurality of frames, at least a portion of the unique sequence number using bit locations unassociated with an SN field of the frame header, where the SN field is defined by a wireless standards association; and transmitting the plurality of frames to a receiving device.

In some implementations, the unassociated bit locations can include one of a new A-Control type field, a counter (CTR) mode with cipher block chaining message authentication code (CBC-MAC) protocol (CCMP) header of an expanded CCMP MPDU, or a Galois counter mode protocol (GCMP) header of an expanded GCMP MPDU. In some implementations, the unassociated bit locations can include repurposed packet number (PN) bits of the CCMP header or the GCMP header. In some other implementations, the unassociated bit locations can include one or more reserved bits of the CCMP header or the GCMP header. For example, the one or more reserved bits can correspond to one or more bits of a reserved octet or a reserved subfield of a key ID octet of the corresponding CCMP header or GCMP header.

In some implementations, the PN bits may be repurposed to include a traffic identifier (TID), the unique sequence number, and one or more pool bits. In some implementations, the method may further include incrementing a value of the one or more pool bits for each retransmission of the respective frame. In some aspects, one or more least significant bits (LSBs) of the unique sequence number also may be included in the sequence number field of the frame header. In some other aspects, the TID also may be included in the frame header.

The frame header can include a MAC header and each of the plurality of frames can include an MPDU. The method can further include encapsulating the MPDU into a packet and transmitting the packet on a wireless medium. In some implementations, the packet can include an A-MPDU. In some other implementations, the packet can include an S-MPDU.

In some implementations, the method can further include embedding the remainder of the unique sequence number into the SN field of the frame header of the respective frame. For example, the SN field can contain 12 bits of the unique sequence number and the bit locations unassociated with the SN field can contain at least one bit of the unique sequence number. In some other implementations, the method can include embedding a bit sequence into the SN field of the frame header of the respective frame, where the bit sequence indicates that the unique sequence number is carried in the CCMP header or the GCMP header. For example, the bit sequence can be a special, fixed, or specification-defined value.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 10 shows an illustrative flowchart depicting an example operation for wireless communications.

FIG. 11 shows an illustrative flowchart depicting another example operation for wireless communications.

FIG. 12 shows an illustrative flowchart depicting another example operation for wireless communications.

FIG. 13 shows an illustrative flowchart depicting another example operation for wireless communications.

Like reference numbers and designations in the various drawings indicate like elements.

DETAILED DESCRIPTION

Figure 1:
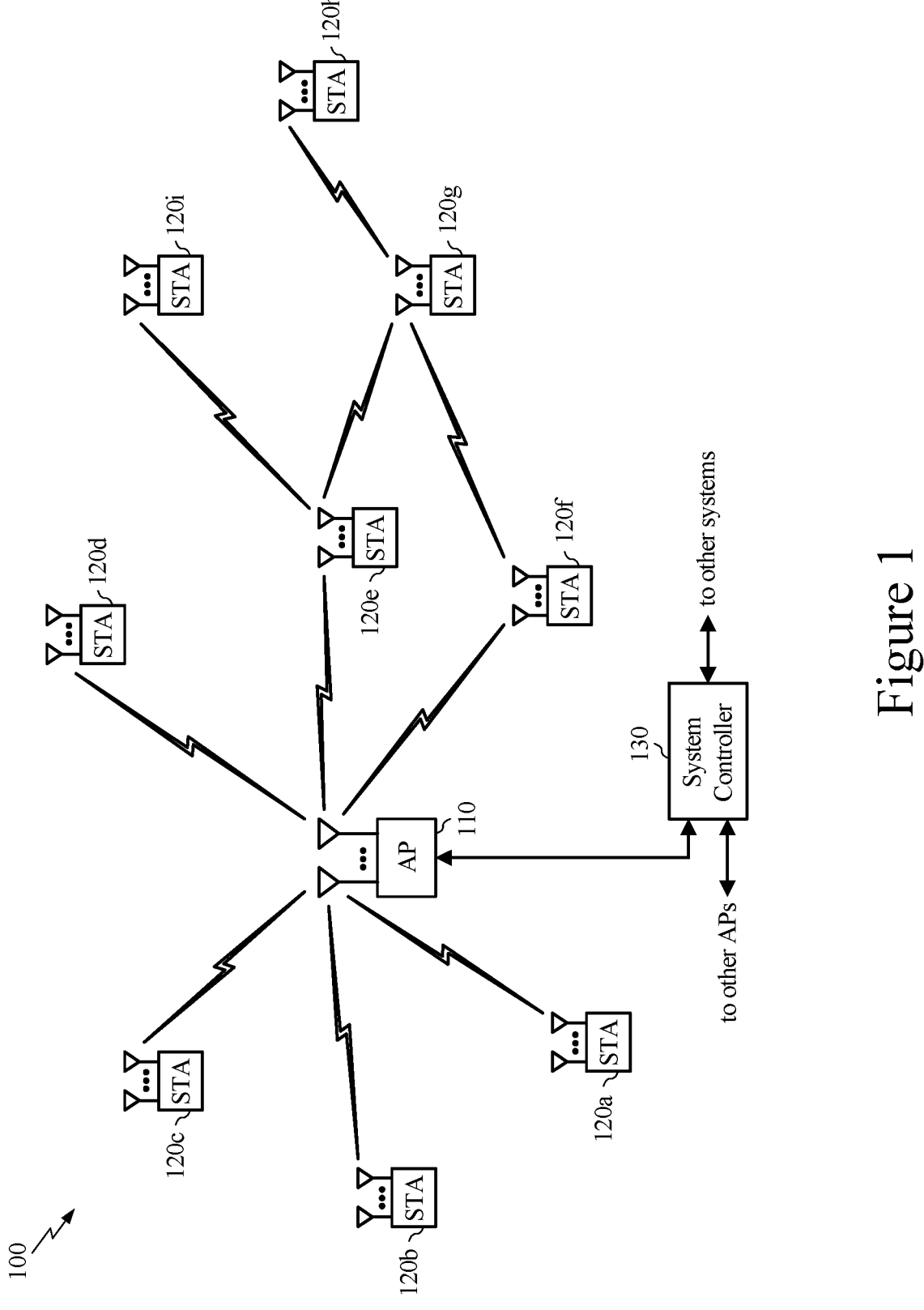
FIG. 1 shows a block diagram of an example wireless system.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Implementations of the subject matter described in this disclosure may be used for expanding the sequence number space of the sequence control field in the media access control (MAC) header of transmitted packets. In some implementations, a sequence number extension may be provided in a MAC protocol data unit (MPDU) delimiter of an aggregated MPDU (A-MPDU). For example, one or more bits may be added to the MPDU delimiter to provide a new sequence number extension field. Alternatively, or in addition, one or more bits of the delimiter signature field of the MPDU delimiter may be repurposed as a sequence number extension subfield. In some other implementations, the sequence number extension may be provided in a high efficiency (HE) control field of the MAC header. For example, a set of bits within the HE control field may be designated as sequence number extension bits. Alternatively, or in addition, a new A-Control type field may be defined for sequence number extension. Still further, in some implementations, the sequence number extension may be provided in a counter (CTR) mode with cipher block chaining message authentication code (CBC-MAC) protocol (CCMP) header of an expanded CCMP MPDU. For example, one or more packet number (PN) fields of the CCMP header may be repurposed to supplement or replace the sequence control field in the MAC header. Alternatively, or in addition, one or more reserved bits of the CCMP header may be used as a sequence number extension.

Particular implementations of the subject matter described in this disclosure can be implemented to realize one or more of the following potential advantages. Existing IEEE 802.11 standards provide a 12-bit sequence number that encompasses a sequence number space of 4096. However, as the throughput of wireless communications continues to expand, additional sequence numbers (>4096) may be needed to support retransmissions of the increasing number of MPDUs. By adding a sequence number extension to MPDU delimiters, aspects of the present disclosure may extend the sequence number space beyond the sequence control field of the MAC header without altering the configuration or increasing the overhead of existing MPDUs. On the other hand, by providing the sequence number extension in the HE control field of the MAC header, aspects of the present disclosure may extend the sequence number space beyond the sequence control field while maintaining support for legacy devices. Still further, by repurposing one or more subfields of a CCMP header as an extension or replacement of the sequence number space, aspects of the present disclosure may increase the sequence number space beyond 4096 values with minimal modifications to the existing MPDU frame format.

FIG. 1 shows a block diagram of an example wireless system 100. The wireless system 100 is shown to include a wireless access point (AP) 110 and a number of wireless stations (STAs) 120a-120i. For simplicity, one AP 110 is shown in FIG. 1. The AP 110 may form a wireless local area network (WLAN) that allows the AP 110, the STAs 120a-120i, and other wireless devices (not shown for simplicity) to communicate with each other over a wireless medium. The wireless medium, which may be divided into a number of channels or into a number of resource units (RUs), may facilitate wireless communications between the AP 110, the STAs 120a-120i, and other wireless devices connected to the WLAN. In some implementations, the STAs 120a-120i can communicate with each other using peer-to-peer communications (such as without the presence or involvement of the AP 110). The AP 110 may be assigned a unique MAC address that is programmed therein by, for example, the manufacturer of the access point. Similarly, each of the STAs 120a-120i also may be assigned a unique MAC address.

In some implementations, the wireless system 100 may correspond to a multiple-input multiple-output (MIMO) wireless network and may support single-user MIMO (SU-MIMO) and multi-user (MU-MIMO) communications. In some implementations, the wireless system 100 may support orthogonal frequency-division multiple access (OFDMA) communications. Further, although the WLAN is depicted in FIG. 1 as an infrastructure Basic Service Set (BSS), in some other implementations, the WLAN may be an Independent Basic Service Set (IBSS), an Extended Service Set (ESS), an ad-hoc network, or a peer-to-peer (P2P) network (such as operating according to one or more Wi-Fi Direct protocols).

The STAs 120a-120i may be any suitable Wi-Fi enabled wireless devices including, for example, cell phones, personal digital assistants (PDAs), tablet devices, laptop computers, or the like. The STAs 120a-120i also may be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The AP 110 may be any suitable device that allows one or more wireless devices (such as the STAs 120a-120i) to connect to another network (such as a local area network (LAN), wide area network (WAN), metropolitan area network (MAN), or the Internet). In some implementations, a system controller 130 may facilitate communications between the AP 110 and other networks or systems. In some implementations, the system controller 130 may facilitate communications between the AP 110 and one or more other APs (not shown for simplicity) that may be associated with other wireless networks. In addition, or in the alternative, the AP 110 may exchange signals and information with one or more other APs using wireless communications.

The AP 110 may periodically broadcast beacon frames to enable the STAs 120a-120i and other wireless devices within wireless range of the AP 110 to establish and maintain a communication link with the AP 110. The bacon frames, which may indicate downlink (DL) data transmissions to the STAs 120a-120i and solicit or schedule uplink (UL) data transmissions from the STAs 120a-120i, are typically broadcast according to a target beacon transmission time (TBTT) schedule. The broadcasted beacon frames may include a timing synchronization function (TSF) value of the AP 110. The STAs 120a-120i may synchronize their own local TSF values with the broadcasted TSF value, for example, so that all of the STAs 120a-120i are synchronized with each other and with the AP 110.

In some implementations, each of the stations STAs 120a-120i and the AP 110 may include one or more transceivers, one or more processing resources (such as processors or Application-Specific Integrated Circuits (ASICs)), one or more memory resources, and a power source (such as a battery). The one or more transceivers may include Wi-Fi transceivers, Bluetooth transceivers, cellular transceivers, or other suitable radio frequency (RF) transceivers (not shown for simplicity) to transmit and receive wireless communication signals. In some implementations, each transceiver may communicate with other wireless devices in distinct frequency bands or using distinct communication protocols.

The memory resources may include a non-transitory computer-readable medium (such as one or more nonvolatile memory elements, such as EPROM, EEPROM, Flash memory, a hard drive, etc.) that stores instructions for performing one or more operations described with respect to FIGS. 5-11.

Figure 2:
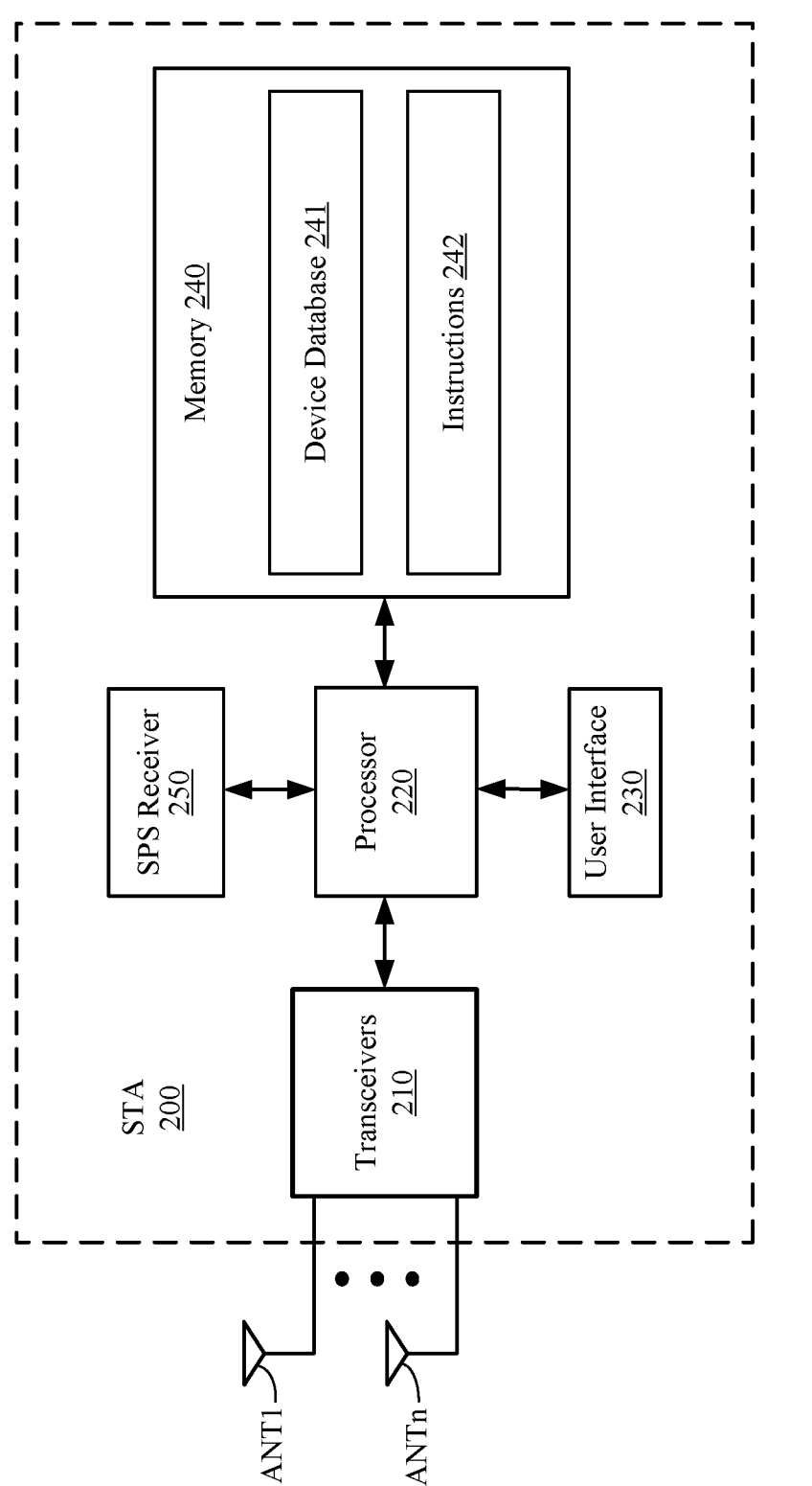
FIG. 2 shows a block diagram of an example wireless station (STA).

FIG. 2 shows an example wireless station (STA) 200. The STA 200 may be one implementation of at least one of the STAs 120a-120i of FIG. 1. The STA 200 may include one or more transceivers 210, a processor 220, a user interface 230, a memory 240, and a number of antennas ANTI-ANTn. The transceivers 210 may be coupled to antennas ANTI-ANTn, either directly or through an antenna selection circuit (not shown for simplicity). The transceivers 210 may be used to transmit signals to and receive signals from other wireless devices including, for example, a number of APs and a number of other STAs. Although not shown in FIG. 2 for simplicity, the transceivers 210 may include any number of transmit chains to process and transmit signals to other wireless devices via antennas ANTI-ANTn, and may include any number of receive chains to process signals received from antennas ANTI-ANTn. Thus, the STA 200 may be configured for MIMO communications and OFDMA communications. The MIMO communications may include SU-MIMO communications and MU-MIMO communications. In some implementations, the STA 200 may use multiple antennas ANTI-ANTn to provide antenna diversity. Antenna diversity may include polarization diversity, pattern diversity, and spatial diversity.

The processor 220 may be any suitable one or more processors capable of executing scripts or instructions of one or more software programs stored in the STA 200 (such as within the memory 240). In some implementations, the processor 220 may be or include one or more microprocessors providing the processor functionality and external memory providing at least a portion of machine-readable media. In other implementations, the processor 220 may be or include an Application Specific Integrated Circuit (ASIC) with the processor, the bus interface, the user interface, and at least a portion of the machine-readable media integrated into a single chip. In some other implementations, the processor 220 may be or include one or more Field Programmable Gate Arrays (FPGAs) or Programmable Logic Devices (PLDs).

The user interface 230, which is coupled to the processor 220, may be or represent a number of suitable user input devices such as, for example, a speaker, a microphone, a display device, a keyboard, a touch screen, and so on. In some implementations, the user interface 230 may allow a user to control a number of operations of the STA 200, to interact with one or more applications executable by the STA 200, and other suitable functions.

In some implementations, the STA 200 may include a satellite positioning system (SPS) receiver 250. The SPS receiver 250, which is coupled to the processor 220, may be used to acquire and receive signals transmitted from one or more satellites or satellite systems via an antenna (not shown for simplicity). Signals received by the SPS receiver 250 may be used to determine (or at least assist with the determination of) a location of the STA 200.

The memory 240 may include a device database 241 that may store location data, configuration information, data rates, a medium access control (MAC) address, timing information, modulation and coding schemes (MCSs), traffic indication (TID) queue sizes, ranging capabilities, and other suitable information about (or pertaining to) the STA 200. The device database 241 also may store profile information for a number of other wireless devices. The profile information for a given wireless device may include, for example, a service set identification (SSID) for the wireless device, a Basic Service Set Identifier (BSSID), operating channels, TSF values, beacon intervals, ranging schedules, channel state information (CSI), received signal strength indicator (RSSI) values, goodput values, and connection history with the STA 200. In some implementations, the profile information for a given wireless device also may include clock offset values, carrier frequency offset values, and ranging capabilities.

The memory 240 also may be or include a non-transitory computer-readable storage medium (such as one or more nonvolatile memory elements, such as EPROM, EEPROM, Flash memory, a hard drive, and so on) that may store computer-executable instructions 242 to perform all or a portion of one or more operations described in this disclosure.

Figure 3:
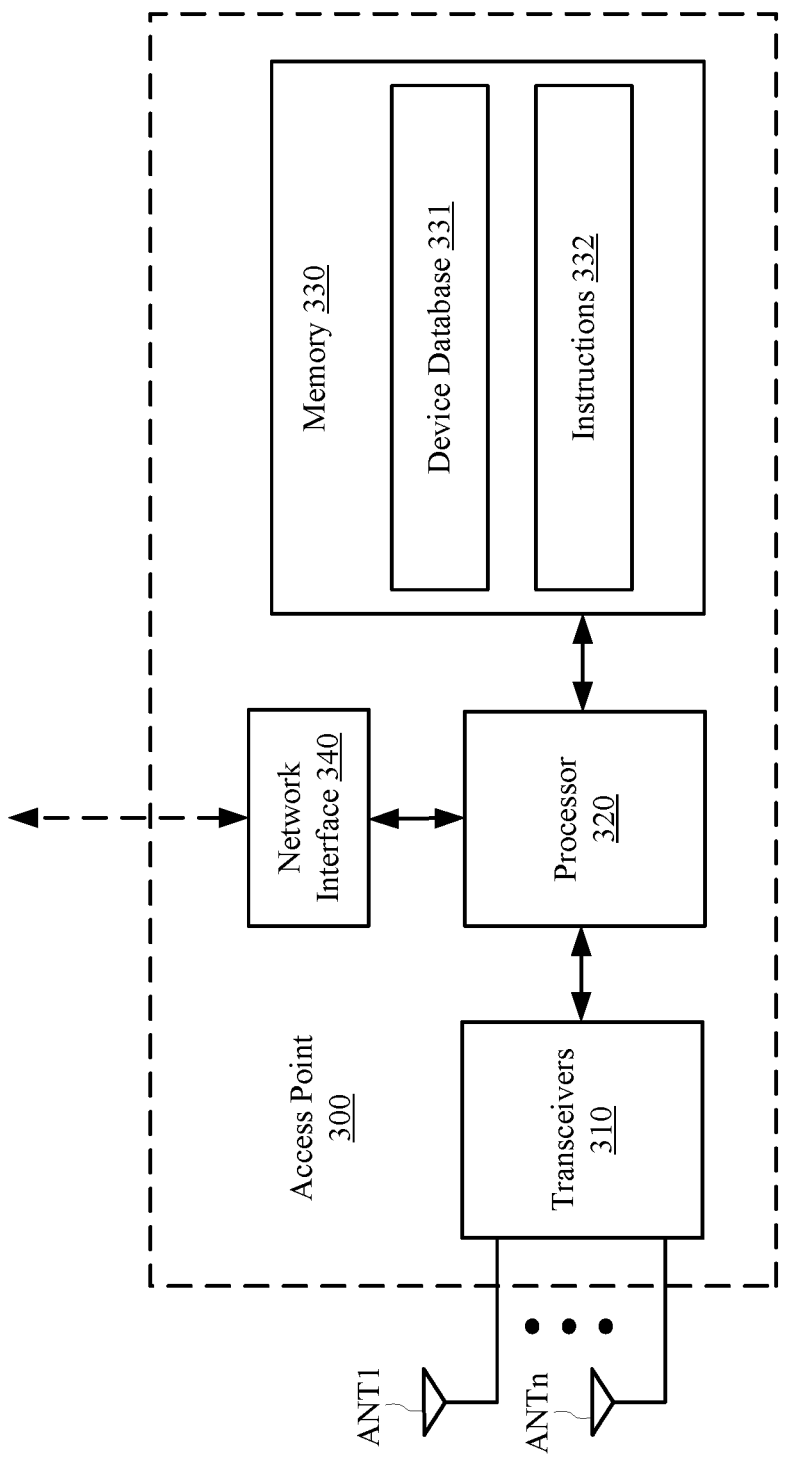
FIG. 3 shows a block diagram of an example access point (AP).

FIG. 3 shows an example access point (AP) 300. The AP 300 may be one implementation of the AP 110 of FIG. 1. The AP 300 may include one or more transceivers 310, a processor 320, a memory 330, a network interface 340, and a number of antennas ANTI-ANTn. The transceivers 310 may be coupled to the antennas ANTI-ANTn, either directly or through an antenna selection circuit (not shown for simplicity). The transceivers 310 may be used to transmit signals to and receive signals from other wireless devices including, for example, one or more of the STAs 120a-120i of FIG. 1 and other APs. Although not shown in FIG. 3 for simplicity, the transceivers 310 may include any number of transmit chains to process and transmit signals to other wireless devices via the antennas ANTI-ANTn, and may include any number of receive chains to process signals received from the antennas ANTI-ANTn. Thus, the AP 300 may be configured for MIMO communications and OFDMA communications. The MIMO communications may include SU-MIMO communications and MU-MIMO communications. In some implementations, the AP 300 may use multiple antennas ANTI-ANTn to provide antenna diversity. Antenna diversity may include polarization diversity, pattern diversity, and spatial diversity.

The network interface 340, which is coupled to the processor 320, may be used to communicate with the system controller 130 of FIG. 1. The network interface 340 also may allow the AP 300 to communicate, either directly or via one or more intervening networks, with other wireless systems, with other APs, with one or more back-haul networks, or any combination thereof.

The memory 330 may include a device database 331 that may store location data, configuration information, data rates, the MAC address, timing information, MCSs, ranging capabilities, and other suitable information about (or pertaining to) the AP 300. The device database 331 also may store profile information for a number of other wireless devices (such as one or more of the stations 120a-120i of FIG. 1). The profile information for a given wireless device may include, for example, an SSID for the wireless device, a BSSID, operating channels, CSI, received signal strength indicator (RSSI) values, goodput values, and connection history with the AP 300. In some implementations, the profile information for a given wireless device also may include TID queue sizes, a preferred packet duration for trigger-based UL transmissions, and a maximum amount of queued UL data that the wireless device is able to insert into TB PPBUs.

The memory 330 also may be or include a non-transitory computer-readable storage medium (such as one or more nonvolatile memory elements, such as EPROM, EEPROM, Flash memory, a hard drive, and so on) that may store computer-executable instructions 332 to perform all or a portion of one or more operations described in this disclosure.

Figure 4:
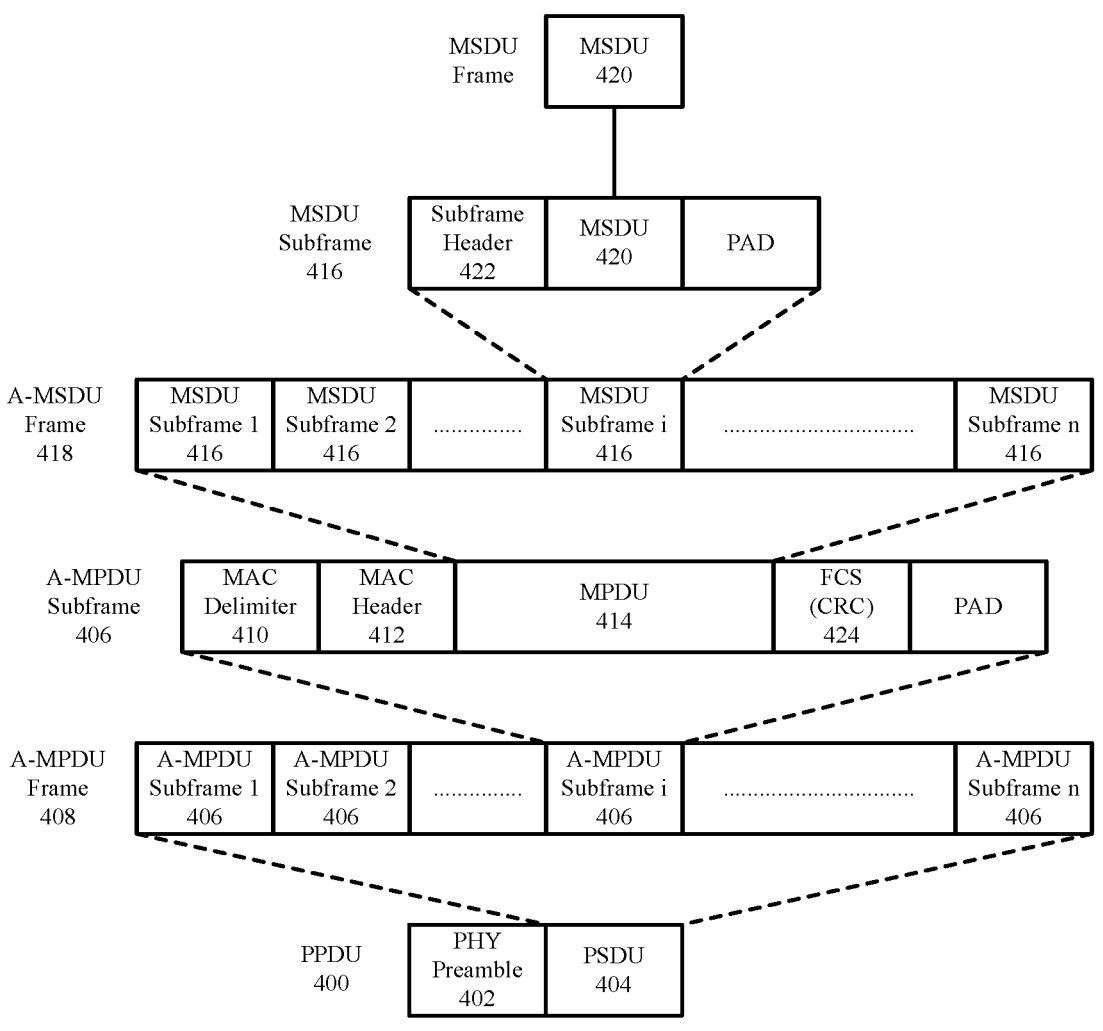
FIG. 4 shows an example physical layer convergence protocol (PLCP) protocol data unit (PPDU).

FIG. 4 shows an example PPDU 400. The PPDU 400 includes a physical layer (PHY) preamble 402 and a PLCP service data unit (PSDU) 404. Each PSDU 404 may carry one or more MAC protocol data units (MPDUs). For example, each PSDU 404 may carry an aggregated MPDU (A-MPDU) 408 that includes an aggregation of multiple A-MPDU subframes 406. An A-MPDU frame carrying a single A-MPDU subframe 406 may be referred to as single MPDU (S-MPDU) frame. Each A-MPDU subframe 406 may include a MAC delimiter 410 and a MAC header 412 prior to the accompanying MPDU 414, which includes the data portion ("payload" or "frame body") of the A-MPDU subframe 406. The MPDU 414 may carry one or more MAC service data unit (MSDU) subframes 416. For example, the MPDU 414 may carry an aggregated MSDU (A-MSDU) 418 including multiple MSDU subframes 416. Each MSDU subframe 416 contains a corresponding MSDU 420 preceded by a subframe header 422.

Referring back to the A-MPDU subframe 406, the MAC header 412 may include a number of fields containing information that defines or indicates characteristics or attributes of data encapsulated within the frame body 414. The MAC header 412 also includes a number of fields indicating addresses for the data encapsulated within the frame body 414. For example, the MAC header 412 may include a combination of a source address, a transmitter address, a receiver address or a destination address. The MAC header 412 may include a frame control field containing control information. The frame control field specifies the frame type, for example, a data frame, a control frame, or a management frame. The MAC header 412 may further including a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 406 also may include a frame check sequence (FCS) field 424 for error detection. For example, the FCS field 416 may include a cyclic redundancy check (CRC).

As described above, APs and STAs can support multi-user (MU) communications; that is, concurrent transmissions from one device to each of multiple devices (for example, multiple simultaneous downlink (DL) communications from an AP to corresponding STAs), or concurrent transmissions from multiple devices to a single device (for example, multiple simultaneous uplink (UL) transmissions from corresponding STAs to an AP). To support the MU transmissions, the APs and STAs may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP to different STAs at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP can transmit a trigger frame to initiate and synchronize an UL MU-OFDMA or UL MU-MIMO transmission from multiple STAs to the AP. Such trigger frames may thus enable multiple STAs to send UL traffic to the AP concurrently in time. A trigger frame may address one or more STAs through respective association identifiers (AIDs), and may assign each AID (and thus each STA) one or more RUs that can be used to send UL traffic to the AP. The AP also may designate one or more random access (RA) RUs that unscheduled STAs may contend for.

Figure 5:
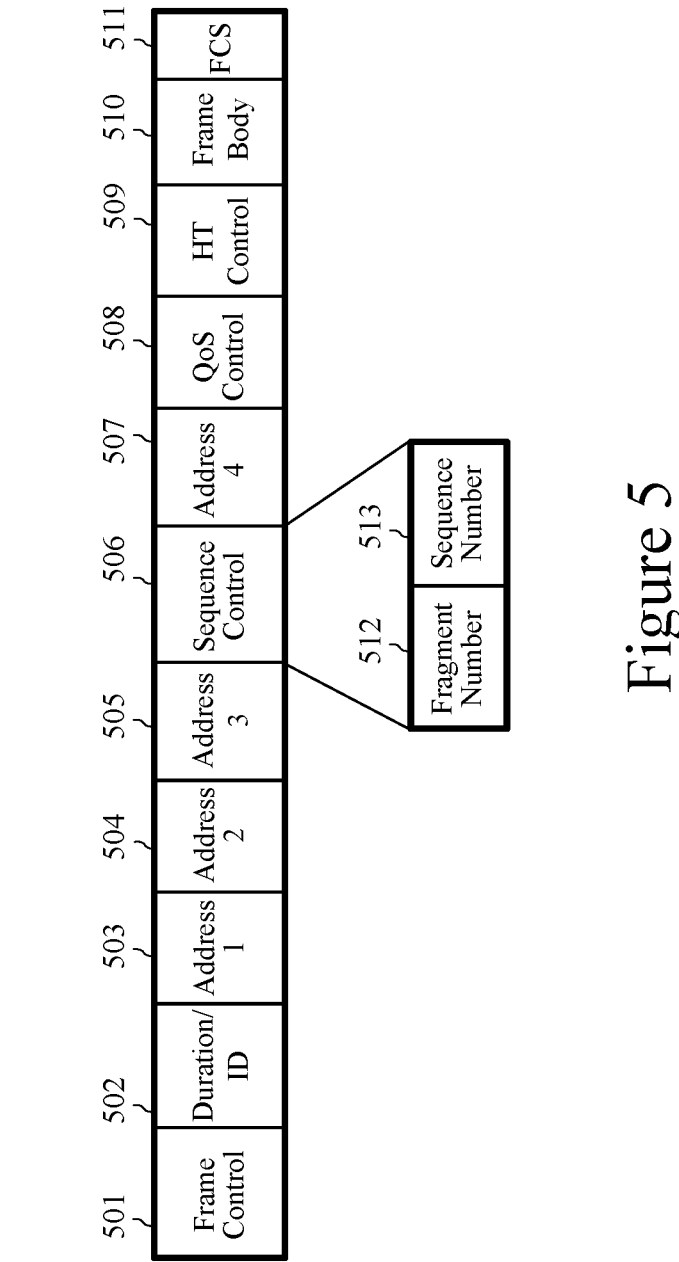
FIG. 5 shows an example media access control (MAC) protocol data unit (MPDU).

FIG. 5 shows an example MPDU 500. The MPDU 500 also may be referred to herein as a PSDU, a MAC frame, or both. The MPDU 500 may be an example implementation of an A-MPDU subframe 406 described with respect to FIG. 4. Thus, the MPDU 500 may be one of a number of data frames contained in a data field of a PPDU.

The MPDU 500 is shown to contain a frame control field 501, a duration/ID field 502, an Address 1 field 503, an Address 2 field 504, an Address 3 field 505, a sequence control field 506, an address 4 field 507, a quality of service (QoS) control field 508, an HT control field 509, a frame body 510, and an FCS field 511. Fields 501-509 may be referred to herein as a MAC header of the MPDU 500.

The frame control field 501 may indicate certain parameters for the MPDU 500, such as a protocol version, a type, and a subtype. The duration/ID field 502 may indicate a duration value, an identifier (such as an AID), or both. The Address 1 field 503, the Address 2 field 504, the Address 3 field 505, and the Address 4 field 507 may contain individual or group addresses for all or a portion of the MPDU 500, such as a basic service set identifier (BSSID), a source address (SA), a destination address (DA), a transmitting STA address (TA), or a receiving STA address (RA). The sequence control field 506 may include a fragment number 512, a sequence number 513, or both, corresponding to the MPDU 500. The HT control field 509 may contain control information for the MPDU 500. The frame body 510 may contain information specific to a frame type, a subtype, or both, for the MPDU 500. The FCS field 511 may contain information for validating or interpreting all or a portion of the MPDU 500.

The QoS control field 508 may identify a traffic category (TC) or a traffic stream (TS) for the MPDU 500 as well as additional information related to, for example, QoS information, A-MPDU information, or mesh information for the MPDU 500. For example, traffic flows may be classified based on a traffic identifier (TID). The TID indicates the priority level of the data and may thus be mapped to a corresponding access category (AC). Example access categories may include, but are not limited to, voice (AC_VO), video (AC_VI), best effort (AC_BE), and background (AC_BK). The information contained in the QoS control field 508 may vary based on a type or a subtype of the MPDU 500.

Various implementations relate generally to retransmitting data that was received in error (such as incorrectly decoded or not received at all) by a receiving device. Current IEEE 802.11 standards allow wireless devices (STAs or APs) to acknowledge multiple data frames or aggregated data frames using a single block acknowledgement (ACK) frame. More specifically, a receiving device may confirm receipt of a plurality of frames from a transmitting device using a single block ACK frame. As a result, the transmitting device may continuously transmit a plurality of frames (rather than waiting for an ACK frame every time one data frame is transmitted to the receiving device). For example, the receiving device may use a block ACK frame to confirm receipt of each of the MPDU subframes transmitted within an A-MPDU frame. With reference for example to FIG. 5, the MPDUs may be identified for retransmission based on the sequence number 513 included in the MAC header of each respective MPDU.

Existing IEEE 802.11 standards define the sequence number 513 as a 12-bit value, providing a sequence number space of 4096. However, as the throughput of wireless communications continues to expand, additional sequence numbers (>4096) may be needed to support retransmissions of the increasing number of MPDUs. Aspects of the present disclosure may expand the sequence number space of the sequence control field 513 beyond the existing sequence number space of 4096. In some implementations, a sequence number extension may be provided in an MPDU delimiter of an A-MPDU. In some other implementations, the sequence number extension may be provided in an HE control field of the MAC header. Still further, in some implementations, the sequence number extension may be provided in a CCMP (or GCMP) header of an expanded CCMP (or GCMP) MPDU.

Figure 6A:
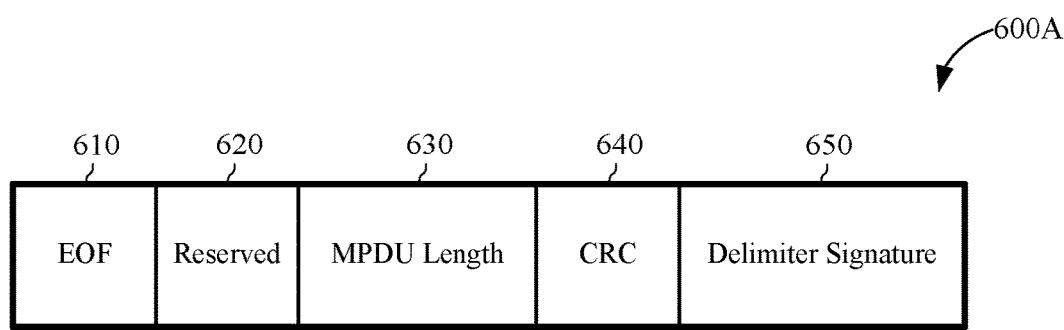
FIGS. 6A-6C show example MPDU delimiters.

FIG. 6A shows an example MPDU delimiter 600A. More specifically, FIG. 6A shows an example MPDU delimiter structure as defined by existing IEEE 802.11 standards. The MPDU delimiter 600A also may be referred to herein as a MAC delimiter. The MPDU delimiter 600A may be an example implementation of the MAC delimiter 410 described with respect to FIG. 4.

The MPDU delimiter 600A is shown to contain an end-of-frame (EOF) field 610, a reserved field 620, an MPDU length field 630, a cyclic redundancy check (CRC) field 640, and a delimiter signature field 650. The EOF field 601 may indicate whether the current MPDU delimiter 600A corresponds to the end of the current A-MPDU frame. The MPDU length field 630 may indicate the length of the following MPDU (if any). The CRC field 640 may contain a (8-bit) CRC of the preceding (16) bits of the MPDU delimiter 600A. The delimiter signature 650 may be a unique pattern of bits that can be used by a receiving device to detect the MPDU delimiter 600A (such as when scanning for an MPDU delimiter).

Aspects of the present disclosure recognize that a respective MPDU delimiter precedes each MPDU in an A-MPDU frame. Moreover, the MPDU delimiter is separate and distinct from the MPDU itself. In other words, the MPDU delimiter does not contribute to the overhead of an individual MPDU. Thus, in some implementations, a sequence number extension may be added to the MPDU delimiter of an A-MPDU. By adding a sequence number extension to MPDU delimiters, aspects of the present disclosure may extend the sequence number space beyond the sequence control field of the MAC header without altering the configuration or increasing the overhead of existing MPDUs.

In some implementations, one or more bits may be added to the existing MPDU delimiter 600A to provide a new sequence number extension field.

Figure 6B:
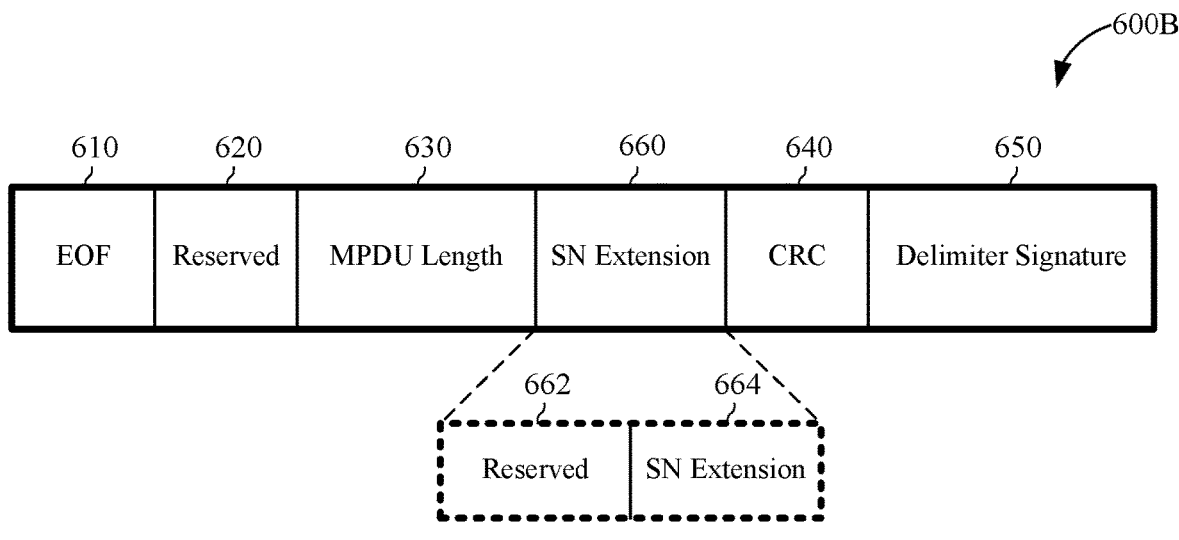

FIG. 6B shows an example MPDU delimiter 600B having a sequence number (SN) extension field 660. The SN extension field 660 may include one or more bits that can be used to extend the sequence number space of the sequence control field 506 of the MPDU 500. More specifically, the bits of the SN extension field 660 may be combined with the 12 bits of the sequence number 513 to provide an expanded sequence number space (beyond the existing 4096 values). For example, the SN extension field 660 may include an additional octet (8 bits) of data. In some aspects, all 8 bits may be combined with the existing 12-bit sequence number 513 to provide a 20-bit sequence number space. In some other aspects, a subset (such as 4 bits) of the SN extension field 660 may be used as the sequence number extension and the remaining bits may be used to carry other information (such as an extension to the MPDU length field 630). Thus, in some implementations, the SN extension field 660 may be further subdivided into a reserved field (or subfield) 662 and an SN extension field (or subfield) 664.

In some implementations, the SN extension field 660 may be greater than 12 bits in length and may thereby serve as a substitute or replacement for the sequence number subfield 513. In other words, the SN extension field 660 may contain the entire sequence number space (such as 2 octets or 16 bits). In such implementations, the sequence control field 506 (or the sequence number subfield 513) may contain a bit sequence to indicate that the sequence number is included, in its entirety, in the MPDU delimiter 600B. The bit sequence may correspond to a special, fixed, or specification-defined value (such as 4096).

In some implementations, the MPDU delimiter format depicted in FIG. 6B may extend the sequence number space well beyond the existing 4096 values provided by the sequence control field 506 (depending on the size of the SN extension field 660 or 664). However, by adding bits to support the SN extension field 660, the MPDU delimiter 600B is made larger than the MPDU delimiter 600A. As a result, the MPDU delimiter 600B may not conform to existing IEEE 802.11 standards. In other words, legacy devices may be unable to interpret the MPDU delimiter format of FIG. 6B.

Figure 6C:
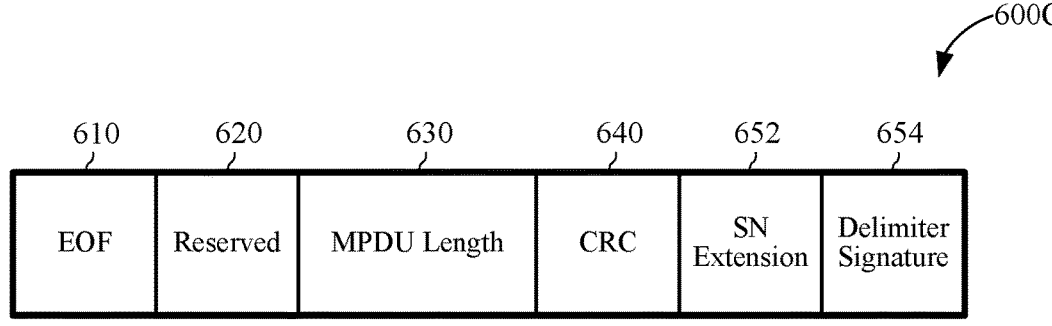

In some other implementations, one or more bits of the delimiter signature field 650 may be repurposed as a sequence number extension subfield. FIG. 6C shows an example MPDU delimiter 600C having a sequence number (SN) extension subfield 652. The SN extension subfield 652 may include one or more bits that can be used to extend the sequence number space of the sequence control field 506 of the MPDU 500. More specifically, the bits of the SN extension subfield 652 may be combined with the 12 bits of the sequence number 513 to provide an expanded sequence number space (beyond the existing 4096 values). For example, the SN extension subfield 652 may include 4 bits of the delimiter signature field 650. As a result, a delimiter signature field 654 of the MPDU delimiter 600C may be reduced to 4 bits. The 4 bits of the SN extension subfield 652 may be combined with the existing 12-bit sequence number 513 to provide a 16-bit sequence number space.

In some implementations, the MPDU delimiter format depicted in FIG. 6C may extend the sequence number space beyond the existing 4096 values provided by the sequence control field 506 without changing the overall length of the MPDU delimiter (as defined by existing IEEE 802.11 standards) or the associated MPDU. As a result, legacy devices (such as any devices that do not support the SN extension subfield 652) also may be able to receive A-MPDUs having the MPDU delimiter format of FIG. 6C. However, in contrast with the SN extension field 660 described with respect to FIG. 6B, the SN extension subfield 652 may not provide as large of an extension to the sequence number space. The SN extension subfield 652 also may not provide reserved bits 662 that can be used to carry additional information (such as an extension to the MPDU length field 630). Further, the reduced size of the delimiter signature field 654 may require modifications to hardware or software. For example, in existing IEEE 802.11 standards, the ASCII value of the character "N" (0x4E) has been used as the unique pattern for the value in the delimiter signature field 650. However, the reduced delimiter signature field 654 may require a new pattern to be used.

Figure 7A:
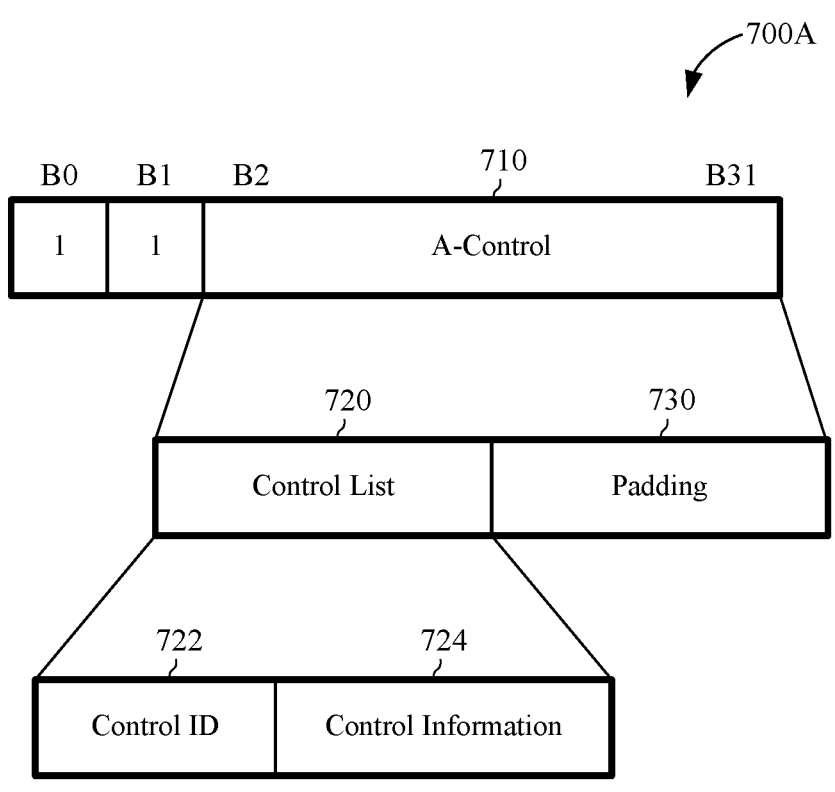
FIGS. 7A and 7B show example high efficiency (HE) control fields of a MAC header.

FIG. 7A shows an example HE control field 700A of a MAC header. More specifically, FIG. 7A shows an example HE control field 700A as defined by existing IEEE 802.11 standards. The HE control field 700A may be an example implementation of the HT control field 509 described with respect to FIG. 5. For example, the HE control field 700A may be an "HE variant" of an HT control field in the MAC header of an MPDU.

The HE control field 700A includes 32 bits (B0-B31). The 1's in the first two bit positions B0 and B1 define the HE control field 700A as an HE variant of an HT control field. The remaining 30 bits B2-B31 may be allocated to an aggregated control (A-Control) subfield 710. The A-Control subfield 710 further includes a control list 730 and zero or more padding bits 730. The control list subfield 730 further contains one or more control ID subfields 722 and associated control information subfields 724. The control ID subfield 722 indicates the type of information carried in the control information subfield 724, which may include various control information for the MPDU. Example types of control information may include, but are not limited to, triggered response scheduling (TRS), operating mode (OM), HE link adaptation (HLA), buffer status report (BSR), UL power headroom (UPH), bandwidth query report (BQR), and command and status (CAS).

In some implementations, a respective HE control field 700A is included in the MAC header of each MPDU. Moreover, the size of the control list 730 may be variable to accommodate different numbers and types of control information 724. Thus, in some implementations, a sequence number extension may be provided in the HE control field 700A. By providing the sequence number extension in the HE control field 700A of the MAC header, aspects of the present disclosure may extend the sequence number space beyond the sequence control field while maintaining support for legacy devices. Moreover, providing the sequence number extension information in the MAC header ensures that the sequence number extension is present in every MPDU.

In some implementations, a set of bits within the HE control field 700A may be designated as sequence number extension bits.

Figure 7B:
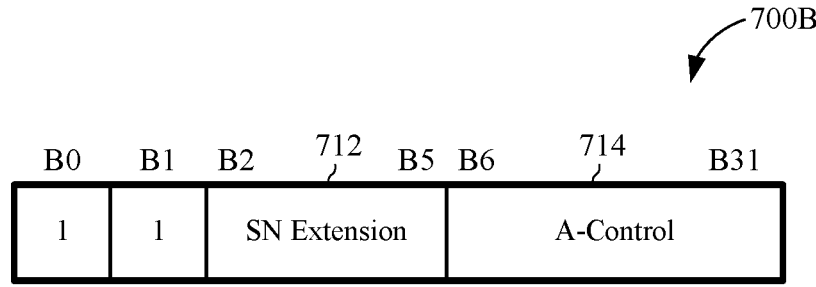

FIG. 7B shows an example HE control field 700B having sequence number (SN) extension bits 712. The SN extension bits 712 may replace one or more bits of the A-Control subfield 710 defined by existing IEEE 802.11 standards. The SN extension bits 712 may be used to extend the sequence number space of the sequence control field 506 of the MPDU 500. More specifically, the SN extension bits 712 may be combined with the 12 bits of the sequence number 513 to provide an expanded sequence number space (beyond the existing 4096 values). For example, the SN extension bits 712 may include the first 4 bits (B2-B5) of the A-Control subfield 710. As a result, an A-Control subfield 714 of the HE control field 700B may be reduced to 26 bits (B6-B31).

The 4 SN extension bits 712 may be combined with the existing 12-bit sequence number 513 to provide a 16-bit sequence number space.

In some implementations, the HE control field format depicted in FIG. 7B may extend the sequence number space beyond the existing 4096 values provided by the sequence control field 506 without increasing the length or overhead of the HE control field or the associated MPDU. Further, legacy devices (such as any devices that do not support the SN extension bits 712) also may be able to receive MPDUs having the HE control field format of FIG. 7B. For example, because sequence number information is used for unicast (individually-addressed) communications between two devices (such as an AP and a STA), any legacy device that receives an MPDU having the HE control field format of FIG. 7B may simply ignore the frame itself (or ignore the HE control field 700B) upon determining that it is not the recipient of the MPDU.

In some other implementations, a new A-Control type field may be defined for sequence number extension. With reference for example to FIG. 7A, the sequence number extension may be provided as a new control information subfield 724 of the A-Control subfield 710. The bits in the new control information subfield 724 may be used to extend the sequence number space of the sequence control field 506 of the MPDU 500. The length of the new control information subfield 724 may be defined based, at least in part, on the desired sequence number space. More specifically, the bits of the control information subfield 724 may be combined with the 12 bits of the sequence number 513 to provide an expanded sequence number space (beyond the existing 4096 values). For example, the new control information subfield 724 may include an octet of data. In some aspects, all 8 bits may be combined with the existing 12-bit sequence number 513 to provide a 20-bit sequence number space. In some other aspects, a subset (such as 4 bits) of the control information subfield 724 may be used as the sequence number extension and the remaining bits may be used to carry other information (such as an extension to the MPDU length field 630).

In some implementations, the new control information subfield 724 may be greater than 12 bits in length and may thereby serve as a substitute or replacement for the sequence number subfield 513. In other words, the new control information subfield 724 may contain the entire sequence number space (up to 26 bits). In such implementations, the sequence control field 506 (or the sequence number subfield 513) may contain a bit sequence to indicate that the sequence number is included, in its entirety, in the HE control field 700B. The bit sequence may correspond to a special, fixed, or specification-defined value (such as 4096).

In some implementations, implementing the sequence number extension as a new control information subfield 724 may extend the sequence number space beyond the existing 4096 values provided by the sequence control field 506 while substantially complying with the HE control field format defined by existing IEEE 802.11 standards. In contrast with the SN extension bits 712 described with respect to FIG. 7B, the control information subfield 724 may provide a much larger extension to the sequence number space (up to 26 bits). The extra bits of the control information subfield 724 also may be used to carry additional information (such as an extension to the MPDU length field 630). However, unlike the SN extension bits 712, a new control ID subfield 722 must be provided with the new control information subfield 724, which would add 4 bits overhead to every MPDU.

Figure 8:
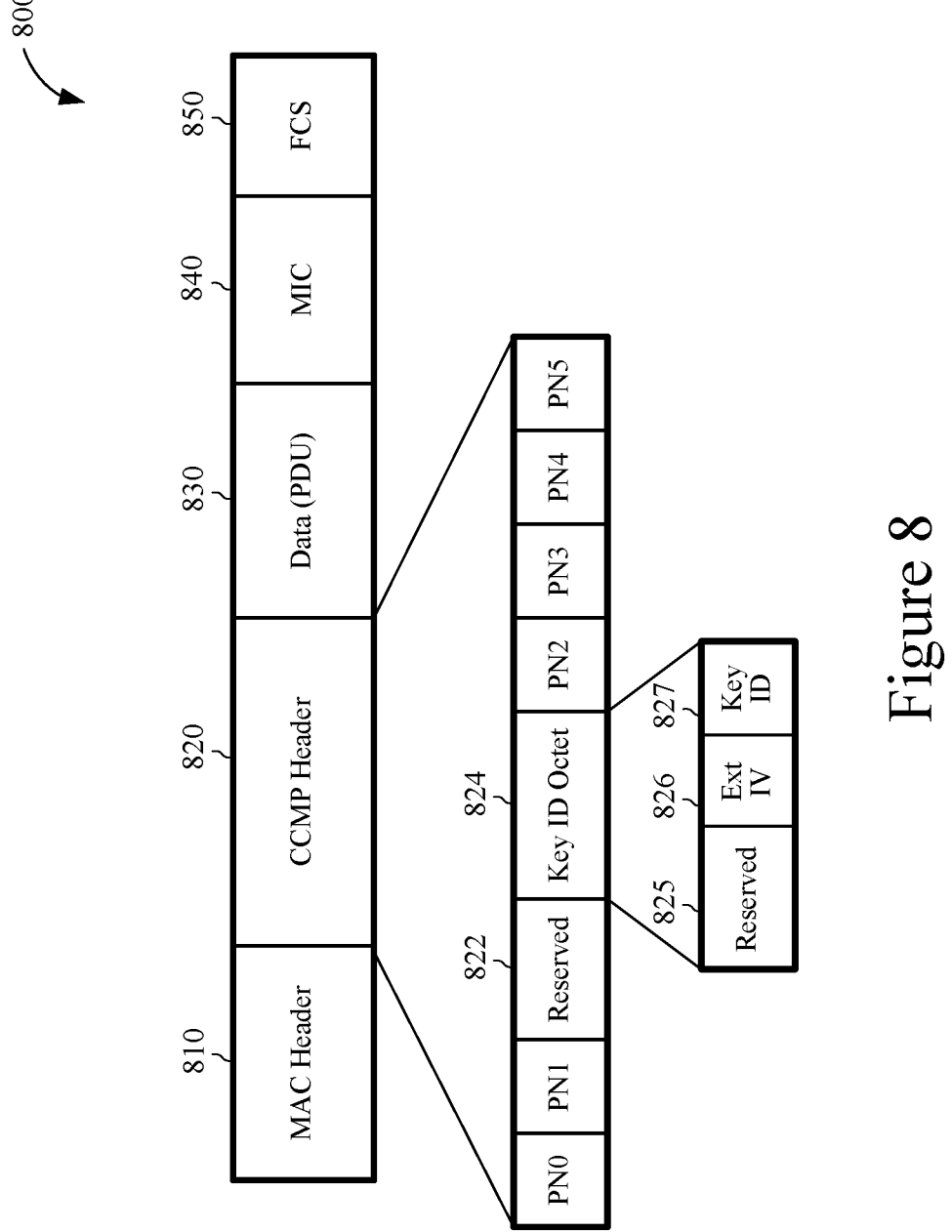
FIG. 8 shows an example expanded counter (CTR) mode with cipher block chaining message authentication code (CBC-MAC) protocol (CCMP) MPDU.

FIG. 8 shows an example expanded counter (CTR) mode with cipher block chaining message authentication code (CBC-MAC) protocol (CCMP) MPDU 800. The CCMP MPDU 800 may be an example implementation of the MPDU 414 described with respect to FIG. 4. Thus, the CCMP MPDU 800 may be one of a number of data frames contained in a data field of a PPDU.

The CCMP MPDU 800 includes a MAC header 810, a CCMP header 820, a data field (or PDU) 830, a MIC field 840, and an FCS field 850. The MAC header 810 may be an example implementation of the MAC header described with respect to FIG. 5. For example, the MAC header 810 may include fields 501-509 of the MPDU 500. The CCMP header 820 may include 8 octets of information including 6 packet number octets PN0-PN5, a reserved octet 822, and a key ID octet 822. The data field 830 may be an example implementation of the frame body 510 described with respect to FIG. 5. The MIC field 840 may contain bits to be used in CCM integrity checking. The FCS field 850 may be an example implementation of the FCS field 511 described with respect to FIG. 5.

CCM may be used to provide data confidentiality, authentication, integrity, or replay protection. CCM requires a fresh temporal key for every session as well as a unique nonce value for each frame protected by a given temporal key. The packet numbers octets PN0-PN5 provide a 48-bit packet number (PN) that can be used to carry the nonce information. More specifically, the packet number is a progressively increasing numerical value which never repeats for the same temporal key. In other words, each successive MPDU will contain an incrementally higher packet number (such as in increments of 1) than the previous MPDU. The packet number may be reset each time the temporal key is refreshed ("re-keying").

In some implementations, a sequence number extension may be provided in the CCMP header 820 of an expanded CCMP MPDU 800. For example, the packet number in the CCMP header 820 shares many similarities with the sequence number in the MAC header 810. Moreover, the PN space can represent a very large range of values ($2^{48}$) which is very unlikely to be used up in its entirety (before re-keying). Thus, in some implementations, the packet number octets PN0-PN5 may be repurposed to provide one or more sequence number bits. By repurposing the PN space as an extension or replacement of the sequence number space, aspects of the present disclosure may increase the sequence number space beyond 4096 values with minimal modifications to the existing MPDU frame format.

In some implementations, one or more PN octets of the CCMP header 820 may be repurposed to include a sequence number extension. For example, aspects of the present disclosure recognize that, due to the vast size of the PN space, the most significant PN octet (PN5) is likely to be underutilized. In other words, the temporal key is likely to be refreshed before the packet number becomes large enough to affect PN5. Further, the most significant bits (MSBs) of PN5 are even less likely to be utilized. Thus, in some aspects, one or more MSBs of PN5 may be repurposed as sequence number (SN) extension bits. The SN extension bits may be used to extend the sequence number space of the sequence control field 506 of the MPDU 500. More specifically, the SN extension bits may be combined with the 12 bits of the sequence number 513 to provide an expanded sequence number space (beyond the existing 4096 values). For example, the SN extension bits may include the 4 MSBs of PN5. Accordingly, the 4 MSBs of PN5 may be combined with the existing 12-bit sequence number 513 to provide a 16-bit sequence number space.

In some implementations, repurposing the MSBs of PN5 as SN extension bits may extend the sequence number space beyond the existing 4096 values provided by the sequence control field 506 without increasing the length or overhead of the MPDU. Further, because the PN space is very large (48 bits), the repurposing of the MSBs may have little or no effect on existing CCM parameters or operations. In other words, the SN extension bits may be implemented without any other modifications to the CCMP header 820 or the remainder of the CCMP MPDU 800.

In some other implementations, the entirety of the PN space PN0-PN5 may be used to supplement or replace the sequence control field in the MAC header 810. For example, aspects of the present disclosure recognize that the packet number, like the sequence number, incrementally increases for each successive MPDU. Thus, in some aspects, the packet number associated with each MPDU also may be interpreted as its sequence number. In other words, all 6 PN octets PN0-PN5 may be used to define the SN space (providing up to $2^{48}$ possible values). Thus, the transmitting device and receiving device may negotiate a block ACK length having any value up to $2^{48}$. Because the PN space is orders of magnitude larger than the SN space defined by existing IEEE 802.11 standards, the PN octets PN0-PN5 of the CCMP header 820 may be used (to identify MPDUs for purposes of retransmission) in lieu of the 12-bit sequence number 513. In some implementations, the sequence control field 506 (or the sequence number subfield 513) may contain a bit sequence to indicate that the sequence number is included, in its entirety, in the CCMP header 820. The bit sequence may correspond to a special, fixed, or specification-defined value (such as 4096).

Aspects of the present disclosure further recognize that sequence numbers are TID-specific. In other words, the SN space is defined per TID (or access category). For example, the sequence numbers associated with MPDUs for voice traffic (AC_VO) may be unrelated to the sequence numbers associated with MPDUs for best effort traffic (AC_BE). In contrast, the packet number, as defined by existing IEEE 802.11 standards, is TID-agnostic. In other words, each successive packet number in an A-MPDU will be incrementally higher (for each successive MPDU) regardless of the TID associated with the MPDU. In some implementations, the PN space may be defined per-TID to ensure compatibility with the SN space. For example, the 48-bit PN space may be repurposed to include a 4-bit TID, followed by a 36-bit sequence number, followed by 8 pool bits. The 4-bit TID may be used to ensure that the PN octets PN0-PN5 represent a unique nonce value per-TID. In some aspects, the 4-bit TID may be omitted from the CCMP header 820 (which may already include a TID). The value of the pool bits may be incremented for each retransmission on the same (or different) link to maintain a unique nonce value while providing a linearly increasing PN sequence.

In some implementations, reusing the PN space as the SN space may extend the sequence number space well beyond the existing 4096 values provided by the sequence control field 506. In some aspects, the PN octets PN0-PN5 of the CCMP header 820 may replace the 12-bit sequence number 513, and thus the sequence control field 506 of the MAC header 810 may be unused or repurposed. This may reduce the overhead of the MAC header 810 or allow additional information to be communicated without increasing the overhead of the MAC header 810. For example, the sequence number subfield 513 of the sequence control field

506 may be used to signal additional fragment information. In other words, the fragment number subfield 512 may span the entirety of the sequence control field 506. In some other aspects, the 12-bit sequence number 513 may include the 12 least significant bits (LSBs) of the sequence number represented by the PN octets PN0-PN5. In this manner, a receiver may use the sequence number included in the MAC header 810 to check or verify the sequence number indicated by the PN octets PN0-PN5. Still further, in some aspects, a receiver may use the TID included in the MAC header 810 to check or verify the TID indicated by the PN octets PN0-PN5.

Still further, in some implementations, one or more reserved bits of the CCMP header 820 may be used as a sequence number extension. As described above, the CCMP header 820 includes a reserved octet 822 and a key ID octet 824. The reserved octet 822 includes 8 reserved bits. The key ID octet 824 includes a reserved subfield 825, an extended IV (ExtIV) subfield 826, and a key ID subfield 827. The extended IV subfield 826 signals that the CCMP header 820 extends the MPDU header by octets. More specifically, the extended IV subfield 826 includes a single bit that is set to 1 for CCMP. The key ID subfield 827 includes 2 bits that may be used for encrypting the data field 830 and the MIC field 840. The reserved subfield 825 includes the remaining 5 bits of the key ID octet 824. In some implementations, any of the 13 reserved bits of the CCMP header 820 (including 8 from the reserved octet 822 and 5 from the reserved subfield 825) may be repurposed as SN extension bits. For example, the SN extension bits may be combined with the 12 bits of the sequence number included in the MAC header 910 to provide an expanded SN space (beyond the existing 4096 values).

Figure 9:
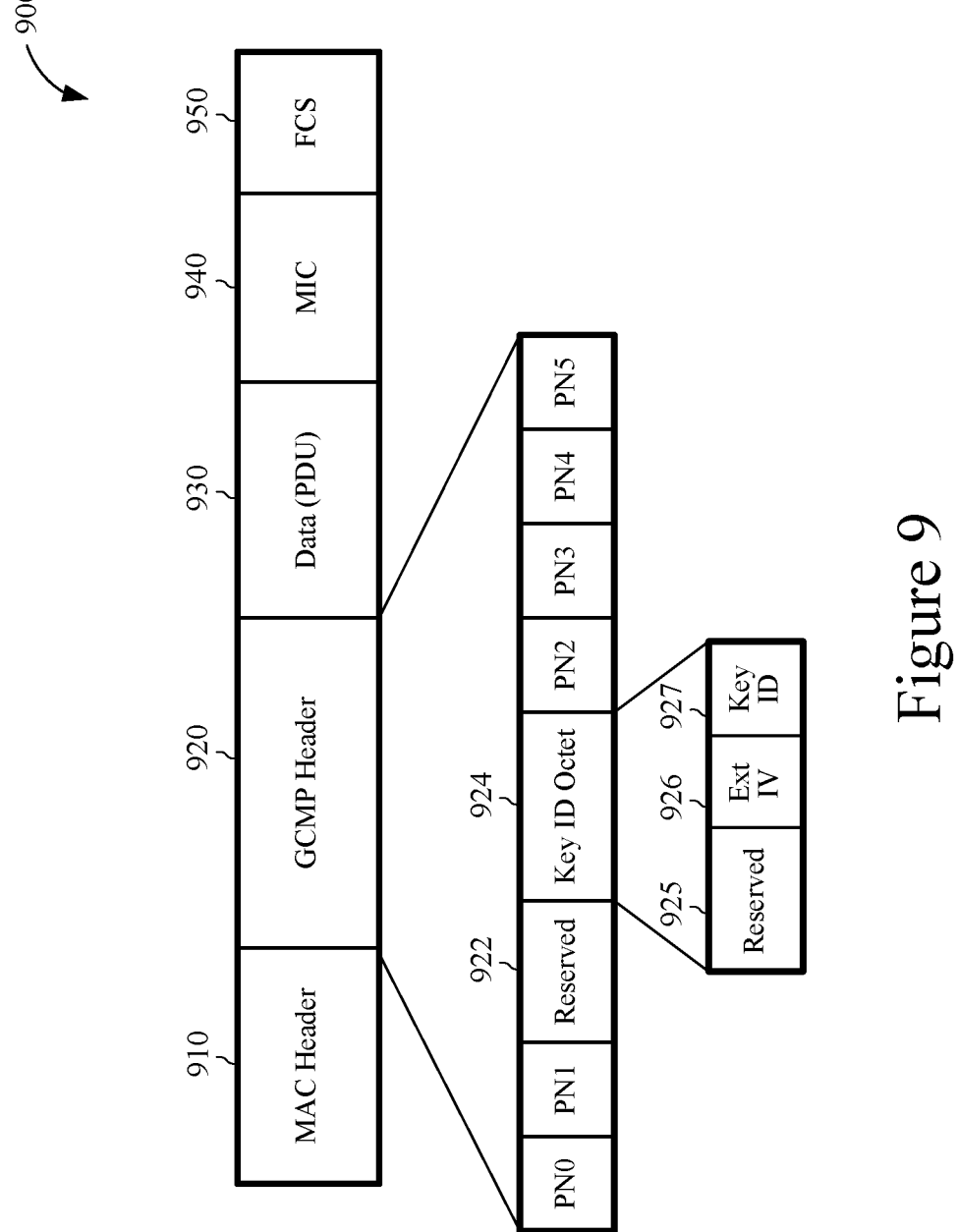
FIG. 9 shows an example expanded Galois counter mode protocol (GCMP) MPDU.

FIG. 9 shows an example expanded Galois counter mode protocol (GCMP) MPDU 900. The GCMP MPDU 900 may be an example implementation of the MPDU 414 described with respect to FIG. 4. Thus, the GCMP MPDU 900 may be one of a number of data frames contained in a data field of a PPDU.

The GCMP MPDU 900 includes a MAC header 910, a CCMP header 920, a data field (or PDU) 930, a MIC field 940, and an FCS field 950. The MAC header 910 may be an example implementation of the MAC header described with respect to FIG. 5. For example, the MAC header 910 may include fields 501-509 of the MPDU 500. The CCMP header 920 may include 8 octets of information including 6 packet number octets PN0-PN5, a reserved octet 922, and a key ID octet 922. The key ID octet 924 further includes a reserved subfield 925, an extended IV (ExtIV) subfield 926, and a key ID subfield 927. The data field 930 may be an example implementation of the frame body 510 described with respect to FIG. 5. The MIC field 940 may contain bits to be used in CCM integrity checking. The FCS field 950 may be an example implementation of the FCS field 511 described with respect to FIG. 5. Similar to CCM, GCM also may be used to provide data confidentiality, authentication, integrity, or replay protection.

As shown in FIG. 9, the packet structure of the GCMP MPDU 900 is substantially similar to the packet structure of the CCMP MPDU 800 depicted in FIG. 8. In particular, the structure of the GCMP header 920 mirrors that of the CCMP header 820. Thus, any of the sequence number extensions that can be implemented in the CCMP header 820 can be similarly implemented in the GCMP header 920 with little or no modification. For example, in some implementations, one or more PN octets of the GCMP header 920 may be repurposed to include a sequence number extension. In some other implementations, the entirety of the PN space (including any of the packet numbers PN0-PN5) may be used to supplement or replace the sequence control field in the MAC header 910. Still further, in some implementations, one or more reserved bits (included in the reserved octet 922 or the reserved subfield 925) may be repurposed as sequence number extension bits.

In some implementations, the PN space may be defined per-TID to ensure compatibility with the SN space. For example, the 48-bit PN space may be repurposed to include a 4-bit TID, followed by a 36-bit sequence number, followed by 8 pool bits. The 4-bit TID may be used to ensure that the PN octets PN0-PN5 represent a unique nonce value per-TID. The value of the pool bits may be incremented for each retransmission on the same (or different) link to maintain a unique nonce value while providing a linearly increasing PN sequence. In some aspects, the 12-bit sequence number in the MAC header 910 may include the 12 LSBs of the sequence number represented by the PN octets PN0-PN5. In this manner, a receiver may use the sequence number included in the MAC header 910 to check or verify the sequence number indicated by the PN octets PN0-PN5. In some other aspects, a receiver may use the TID included in the MAC header 910 to check or verify the TID indicated by the PN octets PN0-PN5.

The various sequence number extensions described with respect to FIGS. 6A-9 may be implemented individually or in combination. Wireless devices (such as APs or STAs) that support one or more of the sequence number extensions may indicate their support via a capability bit. For example, the capability bit may be one or more bits of a capability element provided in beacon frames, probe request frames, probe response frames, association request frames, association response frames, and the like. In some implementations, a wireless device may support for multiple sequence number extension formats. The wireless device may identify each supported sequence number extension format via a bitmap in the capability element.

FIG. 10 shows an illustrative flowchart depicting an example operation 1000 for wireless communications. The example operation 1000 may be performed by a wireless communication device such as a STA or an AP. The AP may be the AP 110 of FIG. 1, the AP 300 of FIG. 3, or any other suitable AP. The STA may be any of the STAs 120a-120i of FIG. 1, the STA 200 of FIG. 2, or any other suitable STA.

The wireless communication device forms, generates, or otherwise produces a plurality of frames for wireless transmission, where each of the plurality of frames includes a respective frame header (1001). The wireless communication device associates each of the plurality of frames with one of a plurality of unique sequence numbers (1002). The wireless communication device embeds, for each of the plurality of frames, at least a portion of the unique sequence number in a control field of the respective frame header (1003). The process 1000 may include additional aspects, such as any single aspect or any combination of aspects described below or in connection with one or more other aspects described elsewhere herein.

In a first aspect, a length of the unique sequence number may be greater than 12 bits.

In a second aspect, alone or in combination with the first aspect, the wireless communication device may further embed the remainder of the unique sequence number in a sequence number (SN) field of the respective frame header, where the SN field is defined by a wireless standards association.

In a third aspect, alone or in combination with one or more of the first and second aspects, the SN field may carry 12 bits of the unique sequence number and the control field may carry at least one bit of the unique sequence number.

In a fourth aspect, alone or in combination with one or more of the first through third aspects, the wireless communication device may further embed a bit sequence in an SN field of the respective frame header, where the bit sequence indicates that the unique sequence number is carried in the control field of the respective frame header.

In a fifth aspect, alone or in combination with one or more of the first through fourth aspects, the frame header may be a MAC header and the control field may include a pair of bits followed by an A-Control subfield.

In a sixth aspect, alone or in combination with one or more of the first through fifth aspects, the at least portion of the unique sequence number may be embedded in a new control information subfield of the A-Control subfield.

In a seventh aspect, alone or in combination with one or more of the first through sixth aspects, the control field may be one of an HE frame control field associated with the IEEE 802.11ax amendment of the IEEE 802.11 standard or an EHT frame control field associated with the IEEE 802.11be amendment of the IEEE 802.11 standard.

In an eighth aspect, alone or in combination with one or more of the first through seventh aspects, the at least portion of the unique sequence number may replace one or more bits of the A-Control subfield of the HE frame control field or the EHT frame control field.

FIG. 11 shows an illustrative flowchart depicting an example operation 1100 for wireless communications. The example operation 1100 may be performed by a wireless communication device such as a STA or an AP. The AP may be the AP 110 of FIG. 1, the AP 300 of FIG. 3, or any other suitable AP. The STA may be any of the STAs 120a-120i of FIG. 1, the STA 200 of FIG. 2, or any other suitable STA.

The wireless communication device receives a plurality of frames from a transmitting device, where each of the plurality of frames includes a respective frame header (1101). The wireless communication device identifies, in each of the plurality of frames, at least a portion of a unique sequence number in a control field of the respective frame header (1102). The wireless communication device selectively requests retransmission of one or more frames by the transmitting device based on the identified portion of the unique sequence number in each of the plurality of frames (1103). The process 1100 may include additional aspects, such as any single aspect or any combination of aspects described below or in connection with one or more other aspects described elsewhere herein.

In a first aspect, a length of the unique sequence number may be greater than 12 bits.

In a second aspect, alone or in combination with the first aspect, the wireless communication device may further identify the remainder of the unique sequence number in a sequence number (SN) field of the frame header of the respective frame, where the SN field is defined by a wireless standards association.

In a third aspect, alone or in combination with one or more of the first and second aspects, the SN field may carry 12 bits of the unique sequence number and the control field may carry at least one bit of the unique sequence number.

In a fourth aspect, alone or in combination with one or more of the first through third aspects, the wireless communication device may further determine, based on a bit sequence in an SN field of the respective frame header, that the unique sequence number is carried in the control field of the respective frame header.

In a fifth aspect, alone or in combination with one or more of the first through fourth aspects, the frame header may be a MAC header and the control field may include a pair of bits followed by an A-Control subfield.

In a sixth aspect, alone or in combination with one or more of the first through fifth aspects, the at least portion of the unique sequence number may be identified in a new control information subfield of the A-Control subfield.

In a seventh aspect, alone or in combination with one or more of the first through sixth aspects, the control field may be one of an HE frame control field associated with the IEEE 802.11ax amendment of the IEEE 802.11 standard or an EHT frame control field associated with the IEEE 802.11be amendment of the IEEE 802.11 standard.

In an eighth aspect, alone or in combination with one or more of the first through seventh aspects, the at least portion of the unique sequence number may replace one or more bits of the A-Control subfield of the HE frame control field or the EHT frame control field.

FIG. 12 shows an illustrative flowchart depicting an example operation 1200 for wireless communications. The example operation 1200 may be performed by a wireless communication device such as a STA or an AP. The AP may be the AP 110 of FIG. 1, the AP 300 of FIG. 3, or any other suitable AP. The STA may be any of the STAs 120a-120i of FIG. 1, the STA 200 of FIG. 2, or any other suitable STA.

The wireless communication device forms, generates, or otherwise produces a plurality of frames for wireless transmission, where each of the plurality of frames includes a respective frame delimiter (1201). The wireless communication device associates each of the plurality of frames with one of a plurality of unique sequence numbers (1202). The wireless communication device embeds, for each of the plurality of frames, at least a portion of the unique sequence number in the respective frame delimiter (1203). The wireless communication device transmits the plurality of frames to a receiving device (1204). The process 1200 may include additional aspects, such as any single aspect or any combination of aspects described below or in connection with one or more other aspects described elsewhere herein.

In a first aspect, the at least portion of the unique sequence number may be embedded in an SN extension field of the frame delimiter.

In a second aspect, alone or in combination with the first aspect, the frame header is a MAC header and each of the plurality of frames is an MPDU.

In a third aspect, alone or in combination with one or more of the first and second aspects, the wireless communication device may further aggregate one or more of the MPDUs into aggregated frames; and transmit one or more of the aggregated frames.

In a fourth aspect, alone or in combination with one or more of the first through third aspects, at least one of the aggregated frames may be an A-MPDU.

In a fifth aspect, alone or in combination with one or more of the first through fourth aspects, at least one of the aggregated frames includes an S-MPDU.

In a sixth aspect, alone or in combination with one or more of the first through fifth aspects, the at least portion of the unique sequence number may be represented by one or more repurposed bits of a delimiter signature field of the frame delimiter.

FIG. 13 shows an illustrative flowchart depicting another example operation 1300 for wireless communications. The example operation 1300 may be performed by a wireless communication device such as a STA or an AP. The AP may be the AP 110 of FIG. 1, the AP 300 of FIG. 3, or any other suitable AP. The STA may be any of the STAs 120a-120i of FIG. 1, the STA 200 of FIG. 2, or any other suitable STA.

The wireless communication device forms, generates, or otherwise produces a plurality of frames for wireless transmission, where each of the plurality of frames includes a frame header (1301). The wireless communication device associates each of the plurality of frames with one of a plurality of unique sequence numbers (1302). The wireless communication device signals, for each of the plurality of frames, at least a portion of the unique sequence number using bit locations unassociated with a sequence number (SN) field of the frame header, where the SN field is defined by a wireless standards association (1303). The wireless communication device transmits the plurality of frames to a receiving device (1304). The process 1300 may include additional aspects, such as any single aspect or any combination of aspects described below or in connection with one or more other aspects described elsewhere herein.

In a first aspect, the unassociated bit locations may be one of a new A-Control type field, a CCMP header of an expanded CCMP MPDU, or a GCMP header of an expanded GCMP MPDU.

In a second aspect, alone or in combination with the first aspect, the unassociated bit locations may be repurposed packet number (PN) bits of the CCMP header or the GCMP header.

In a third aspect, alone or in combination with one or more of the first and second aspects, the PN bits may be repurposed to include one or more of a TID, the unique sequence number, or one or more pool bits.

In a fourth aspect, alone or in combination with one or more of the first through third aspects, the wireless communication device may further increment a value of the one or more pool bits for each retransmission of the respective frame.

In a fifth aspect, alone or in combination with one or more of the first through fourth aspects, one or more LSBs of the unique sequence number may be included in the sequence number field of the frame header.

In a sixth aspect, alone or in combination with one or more of the first through fifth aspects, the TID may be included in the frame header.

In a seventh aspect, alone or in combination with one or more of the first through sixth aspects, the unassociated bit locations may include one or more reserved bits of the CCMP header or the GCMP header.

In an eighth aspect, alone or in combination with one or more of the first through seventh aspects, each of the CCMP header and the GCMP header may include a reserved octet and a key ID octet, where the one or more reserved bits includes one or more bits of the reserved octet or one or more bits of a reserved subfield of the key ID octet.

In a ninth aspect, alone or in combination with one or more of the first through eighth aspects, the wireless communication device may further embed the remainder of the unique sequence number into the SN field of the frame header of the respective frame.

In a tenth aspect, alone or in combination with one or more of the first through ninth aspects, the SN field may contain 12 bits of the unique sequence number and the bit locations unassociated with the SN field may contain at least one bit of the unique sequence number.

In an eleventh aspect, alone or in combination with one or more of the first through tenth aspects, the wireless communication device may further embed a bit sequence into the SN field of the frame header of the respective frame, where the bit sequence indicates that the unique sequence number is carried in the CCMP header or the GCMP header.

In a twelfth aspect, alone or in combination with one or more of the first through eleventh aspects, the bit sequence may be a special, fixed, or specification-defined value.

In a thirteenth aspect, alone or in combination with one or more of the first through twelfth aspects, the frame header may be a MAC header and each of the plurality of frames may be an MPDU.

In a fourteenth aspect, alone or in combination with one or more of the first through thirteenth aspects, the wireless communication device may further encapsulate the MPDU into a packet and transmit the packet on a wireless medium.

In a fifteenth aspect, alone or in combination with one or more of the first through fourteenth aspects, the packet may be an A-MPDU.

In a sixteenth aspect, alone or in combination with one or more of the first through fifteenth aspects, the packet may be an S-MPDU.

Figure 14:
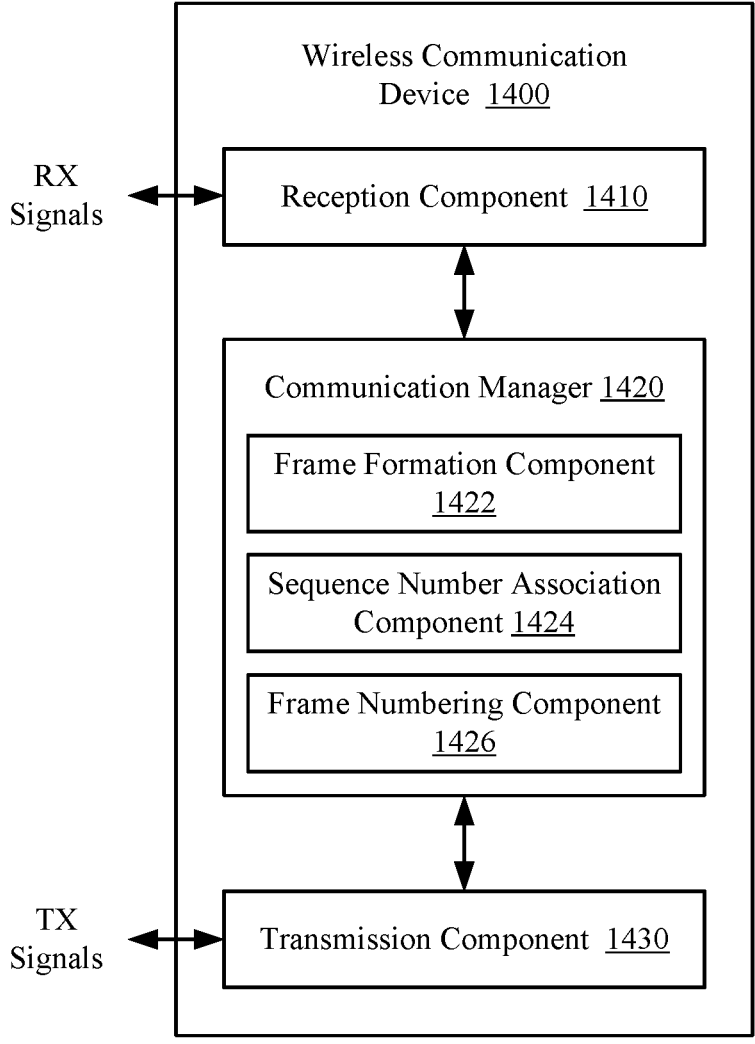
FIG. 14 shows a block diagram of an example wireless communication device.

FIG. 14 shows a block diagram of an example wireless communication device 1400. In some implementations, the wireless communication device 1400 may be configured to perform the process 1000 described above with reference to FIG. 10. The wireless communication device 1400 can be an example implementation of the STA 200 of FIG. 2 or the AP 300 of FIG. 3. For example, the wireless communication device 1400 can be a chip, SoC, chipset, package or device that includes at least one processor and at least one modem (for example, a Wi-Fi (IEEE 802.11) modem or a cellular modem).

The wireless communication device 1400 includes a reception component 1410, a communication manager 1420, and a transmission component 1430. The communication manager 1420 further includes a frame format component 1422, a sequence number association component 1424, and a frame numbering component 1426. Portions of one or more of the components 1422-1426 may be implemented at least in part in hardware or firmware. In some implementations, at least some of the components 1422, 1424, or 1426 are implemented at least in part as software stored in a memory (such as the memory 240 or 330). For example, portions of one or more of the components 1422, 1424, and 1426 can be implemented as non-transitory instructions (or "code") executable by a processor (such as the processor 220 or 320) to perform the functions or operations of the respective component.

The reception component 1410 is configured to receive RX signals from other wireless communication devices. In some implementations, the RX signals may include feedback from one or more receiving devices. The communication manager 1420 is configured to manage retransmissions with the one or more receiving devices. In some implementations, the frame formation component 1422 may form, generate, or otherwise produce a plurality of frames for wireless transmission, where each of the plurality of frames includes a respective frame header; the sequence number association component 1424 may associate each of the plurality of frames with one of a plurality of unique sequence numbers; and the frame numbering component 1426 may embed, for each of the plurality of frames, at least a portion of the unique sequence number in a control field of the respective frame header. The transmission component 1430 is configured to transmit the plurality of frames, as TX signals, to the one or more receiving devices.

Figure 15:
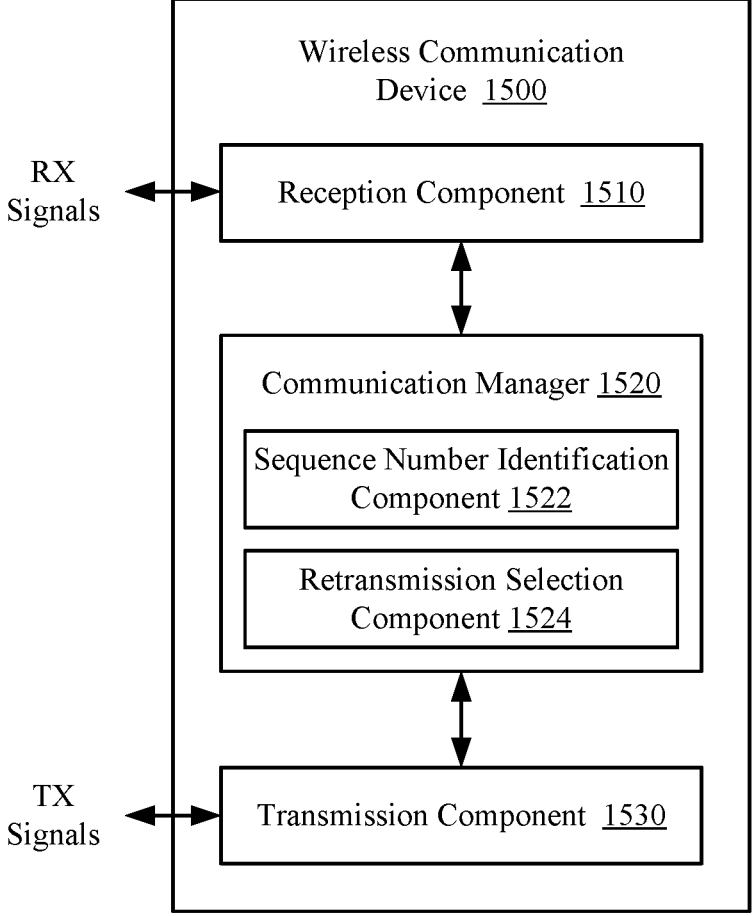
FIG. 15 shows another block diagram of an example wireless communication device.

FIG. 15 shows a block diagram of an example wireless communication device 1500. In some implementations, the wireless communication device 1500 may be configured to perform the process 1100 described above with reference to FIG. 11. The wireless communication device 1500 can be an example implementation of the STA 200 of FIG. 2 or the AP 300 of FIG. 3. For example, the wireless communication device 1500 can be a chip, SoC, chipset, package or device that includes at least one processor and at least one modem (for example, a Wi-Fi (IEEE 802.11) modem or a cellular modem).

The wireless communication device 1500 includes a reception component 1510, a communication manager 1520, and a transmission component 1530. The communication manager 1520 further includes a sequence number identification component 1522 and a retransmission selection component 1524. Portions of one or more of the components 1522 and 1524 may be implemented at least in part in hardware or firmware. In some implementations, at least some of the components 1522 or 1524, are implemented at least in part as software stored in a memory (such as the memory 240 or 330). For example, portions of one or more of the components 1522 and 1524 can be implemented as non-transitory instructions (or "code") executable by a processor (such as the processor 220 or 320) to perform the functions or operations of the respective component.

The reception component 1510 is configured to receive RX signals from other wireless communication devices. In some implementations, the RX signals may include a plurality of frames transmitted by a transmitting device. The communication manager 1520 is configured to manage retransmissions with the one or more receiving devices. In some implementations, the sequence number identification component 1522 may identify, in each of the plurality of frames, at least a portion of a unique sequence number in a control field of a respective frame header; and the retransmission selection component 1524 may selectively request retransmission of one or more frames by the transmitting device based on the identified portion of the unique sequence number in each of the plurality of frames. The transmission component 1530 is configured to transmit TX signals to other wireless communication devices. In some implementations, the TX signals may include feedback indicating one or more frames to be retransmitted by the transmitting device.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication, comprising:
   forming a plurality of frames, each of the plurality of frames including a frame header, each of the plurality of frames being associated with one of a plurality of unique sequence numbers, each of the plurality of frames indicating a first portion of a respective unique sequence number using a sequence control field of the frame header, each of the plurality of frames indicating a second portion of the respective unique sequence number using a field that does not comprise the sequence control field, wherein the field comprises a reserved octet; and
   transmitting the plurality of frames.

2. The method of claim 1, wherein the field comprises one of a A-Control type field, a counter (CTR) mode with cipher block chaining message authentication code (CBC-MAC) protocol (CCMP) header of an expanded CCMP medium access control (MAC) protocol data unit (MPDU), or a Galois counter mode protocol (GCMP) header of an expanded GCMP MPDU.

3. The method of claim 2, wherein the field comprises repurposed packet number (PN) bits of the CCMP header or the GCMP header.

4. The method of claim 3, wherein the repurposed PN bits are repurposed to include one or more of a traffic identifier (TIO), the respective unique sequence number, or one or more pool bits.

5. The method of claim 4, further comprising:
   incrementing a value of the one or more pool bits for each retransmission of a respective frame associated with the respective unique sequence number.

6. The method of claim 4, wherein one or more least significant bits (LSBs) of the respective unique sequence number are included in the sequence control field of the frame header.

7. The method of claim 4, wherein the TIO is included in the frame header.

8. The method of claim 1, wherein the field comprises a counter (CTR) mode with cipher block chaining message authentication code (CBC-MAC) protocol (CCMP) header, or a Galois counter mode protocol (GCMP) header.

9. The method of claim 8, wherein each of the CCMP header and the GCMP header includes the reserved octet and a key identifier octet.

10. The method of claim 1, wherein the sequence control field contains 12 bits of a respective unique sequence number, and the field contains at least one bit of the respective unique sequence number.

11. The method of claim 1, further comprising:
embedding a bit sequence into the sequence control field of the frame header of a respective frame, the bit sequence indicating that a respective unique sequence number is carried in a counter (CTR) mode with cipher block chaining message authentication code (CBC-MAC) protocol (CCMP) header or a Galois counter mode protocol (GCMP) header.

12. The method of claim 11, wherein the bit sequence comprises a special, fixed, or specification-defined value.

13. The method of claim 1, wherein the frame header comprises a medium access control (MAC) header, and each of the plurality of frames comprises a MAC protocol data unit (MPDU).

14. The method of claim 13, further comprising:
encapsulating the MPDU into a packet; and
transmitting the packet.

15. The method of claim 14, wherein the packet comprises an aggregated MPDU (A-MPDU), and wherein one or more bit locations of the field are provided in an MPDU delimiter of the A-MPDU.

16. The method of claim 14, wherein the packet comprises a single MPDU (S-MPDU), and wherein one or more bit locations of the field are provided in an MPDU delimiter of the S-MPDU.

17. A wireless communication device, comprising:
at least one transceiver,
at least one processor, and at least one memory comprising instructions that, when executed by the at least one processor, cause the wireless communication device to:
form a plurality of frames for wireless transmission, each of the plurality of frames including a frame header, each of the plurality of frames being associated with one of a plurality of unique sequence number, each of the plurality of frames indicating a first portion of a respective unique sequence number using a sequence control field of the frame header, each of the plurality of frames indicating a second portion of the respective unique sequence number using a field that does not comprise the sequence control field, wherein the field comprises a reserved octet; and
transmit, via the at least one transceiver, the plurality of frames.

18. The wireless communication device of claim 17, wherein the field comprises one of a A-Control type field, a counter (CTR) mode with cipher block chaining message authentication code (CBC-MAC) protocol (CCMP) header of an expanded CCMP medium access control (MAC) protocol data unit (MPDU), or a Galois counter mode protocol (GCMP) header of an expanded GCMP MPDU.

19. A non-transitory computer-readable medium storing code for wireless communication, the code comprising instructions executable by one or more processors to cause a wireless communication device to:
form a plurality of frames for wireless transmission, each of the plurality of frames including a frame header, each of the plurality of frames associated with one of a plurality of unique sequence number, each of the plurality of frames indicating a first portion of a respective unique sequence number using a sequence control field of the frame header, each of the plurality of frames indicating a second portion of the respective unique sequence number using a field that does not comprise the sequence control field, wherein the field comprises a reserved octet; and
transmit the plurality of frames.

* * * * *